(12) United States Patent
Takagimoto et al.

(10) Patent No.: US 10,728,980 B2
(45) Date of Patent: Jul. 28, 2020

(54) SWITCH DRIVING DEVICE, LIGHT-EMITTING DEVICE, AND VEHICLE

(71) Applicant: Rohm Co., Ltd., Kyoto (JP)

(72) Inventors: Shinsuke Takagimoto, Kyoto (JP); Yasunori Muramatsu, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 229 days.

(21) Appl. No.: 15/556,648

(22) PCT Filed: Feb. 4, 2016

(86) PCT No.: PCT/JP2016/053361
§ 371 (c)(1),
(2) Date: Sep. 8, 2017

(87) PCT Pub. No.: WO2016/152272
PCT Pub. Date: Sep. 29, 2016

(65) Prior Publication Data
US 2018/0054862 A1  Feb. 22, 2018

(30) Foreign Application Priority Data

Mar. 20, 2015  (JP) .................................. 2015-058364

(51) Int. Cl.
*B60Q 1/34* (2006.01)
*H05B 45/37* (2020.01)
(Continued)

(52) U.S. Cl.
CPC .............. *H05B 45/37* (2020.01); *B60Q 1/34* (2013.01); *B60Q 1/38* (2013.01); *B60Q 1/44* (2013.01);
(Continued)

(58) Field of Classification Search
CPC .. H05B 33/0815; H05B 37/029; H05B 37/03; H05B 37/02; H05B 33/0827;
(Continued)

(56) References Cited

U.S. PATENT DOCUMENTS 9,497,811 B2 * 11/2016 Schijffelen ......... H05B 33/0809
2003/0117088 A1 * 6/2003 Tanabe ............... H05B 33/0815
315/291
(Continued)

FOREIGN PATENT DOCUMENTS

CN       1517968 A    8/2004
CN     101777911 A    7/2010
(Continued)

OTHER PUBLICATIONS

European Patent Office, EESR for EP 16768175.8, dated Sep. 4, 2018.
(Continued)

*Primary Examiner* — Amit Chatly
(74) *Attorney, Agent, or Firm* — Fish & Richardson P.C.

(57) ABSTRACT

A switch driving device 10 comprises: multichannel switch elements SW1 to SW8 which are connected in parallel to a plurality of light-emitting elements included in a vehicle-mounted light-emitting device; and a logic portion 120 which automatically starts a series of switch driving sequence so that the on-off states of the switch elements SW1 to SW8 are sequentially switched in a predetermined pattern in response to the power-on of the device.

18 Claims, 20 Drawing Sheets

(51) Int. Cl.
  *B60Q 1/44* (2006.01)
  *B60Q 1/38* (2006.01)
  *B60Q 11/00* (2006.01)
  *H05B 45/46* (2020.01)
  *H05B 47/10* (2020.01)
  *H05B 47/20* (2020.01)
  *H05B 47/155* (2020.01)
  *G09G 3/34* (2006.01)

(52) U.S. Cl.
  CPC ............ *B60Q 11/00* (2013.01); *G09G 3/342* (2013.01); *H05B 45/46* (2020.01); *H05B 47/10* (2020.01); *H05B 47/155* (2020.01); *H05B 47/20* (2020.01); *G09G 2320/0233* (2013.01); *G09G 2320/064* (2013.01)

(58) Field of Classification Search
  CPC ........... G09G 3/342; G09G 2320/0233; G09G 2320/064; B60Q 1/34; B60Q 11/00; B60Q 1/44; B60Q 1/38
  See application file for complete search history.

(56) References Cited

U.S. PATENT DOCUMENTS

| | | | |
|---|---|---|---|
| 2004/0145560 A1 | 7/2004 | Kim | |
| 2009/0167398 A1* | 7/2009 | Oishi | H05B 33/0815 327/261 |
| 2010/0328370 A1 | 12/2010 | Takata et al. | |
| 2011/0084622 A1* | 4/2011 | Barrow | H05B 33/0815 315/250 |
| 2014/0015409 A1 | 1/2014 | Tetsuka et al. | |
| 2014/0097754 A1* | 4/2014 | Chiang | H05B 33/089 315/122 |
| 2014/0203726 A1 | 7/2014 | Katsura | |
| 2015/0061543 A1 | 3/2015 | Pierce et al. | |
| 2015/0189711 A1* | 7/2015 | Horsky | H05B 33/083 315/186 |

FOREIGN PATENT DOCUMENTS

| | | |
|---|---|---|
| CN | 203251457 U | 10/2013 |
| CN | 203504842 U | 3/2014 |
| CN | 104219838 A | 12/2014 |
| EP | 2674327 | 12/2013 |
| JP | S55-118112 A | 9/1980 |
| JP | H06-107025 A | 4/1994 |
| JP | 2008-091311 A | 4/2008 |
| JP | 2008-251276 A | 10/2008 |
| JP | 2010-015714 A | 1/2010 |
| JP | 2013084635 | 5/2013 |
| JP | 2013-200968 A | 10/2013 |
| JP | 2014-170880 A | 9/2014 |
| JP | 2014229510 | 12/2014 |
| WO | 2010/150444 A | 12/2010 |

OTHER PUBLICATIONS

People's Republic of China Patent Office; Chinese Office Action issued in corresponding Chinese patent application No. 201680016810.3 (dated Feb. 2, 2019).

Japan Patent Office, International Search Report for PCT/JP2016/053361, dated May 10, 2016 (with English translation).

* cited by examiner

FIG. 11

| SEL1 | SEL2 | SEL3 | LED ||||||||
|---|---|---|---|---|---|---|---|---|---|---|
| | | | 1 | 2 | 3 | 4 | 5 | 6 | 7 | 8 |
| GND | GND | GND | ○ | ○ | ○ | ○ | ○ | ○ | ○ | ○ |
| VREG | GND | GND | ○ | ○ | ○ | ○ | ○ | ○ | ○ | × |
| GND | VREG | GND | ○ | ○ | ○ | ○ | ○ | ○ | × | × |
| VREG | VREG | GND | ○ | ○ | ○ | ○ | ○ | × | × | × |
| GND | GND | VREG | ○ | ○ | ○ | ○ | × | × | × | × |
| VREG | GND | VREG | ○ | ○ | ○ | × | × | × | × | × |
| GND | VREG | VREG | ○ | ○ | × | × | × | × | × | × |
| VREG | VREG | VREG | ○ | × | × | × | × | × | × | × |

SWITCH DRIVING DEVICE, LIGHT-EMITTING DEVICE, AND VEHICLE

TECHNICAL FIELD

The present invention relates to switch driving devices, and to light-emitting devices and vehicles that employ switch driving devices.

BACKGROUND ART

FIG. 18 is an application diagram showing a vehicle as a first conventional example. The vehicle A100 of the first conventional example includes a battery A110, a power switch A120, a controller A130, and a light-emitting device A140 (such as a turn lamp). The controller A130 turns ON and OFF the power switch A120 to switch the power supply path from the battery A110 to the light-emitting device A140 between a conducting state and a cut-off state, and thereby achieves simple lighting/extinguishing control of the light-emitting device A140.

On the other hand, in practical use today are such light-emitting devices for mounting on vehicles as are provided with a sequential lighting function (often called a sequential turn function or a dynamic indicator function) whereby a plurality of light-emitting elements are lit and extinguished with arbitrary timing so as to increase and decrease the area of the lit region or to move the lit region to make it appear to run.

FIGS. 19A and 19B are application diagrams each showing a vehicle as a second conventional example. The vehicle A200 in FIG. 19A includes a battery A210, a power switch A220, a controller A230, and a light-emitting device A240. The light-emitting device A240 is provided with a sequential lighting function as mentioned above, and includes light-emitting element driving devices A241(1) to (m), light-emitting elements A242(1) to (m), a microprocessor A243 for controlling the light-emitting element driving devices A241(1) to (m), a driver power supply A244 for supplying electric power to the light-emitting element driving devices A241(1) to (m), and a microprocessor power supply A245 for supplying electric power to the microprocessor A243.

On the other hand, in the vehicle A200 in FIG. 19B, the microprocessor A243, the driver power supply A244, and the microprocessor power supply A245 mentioned above are omitted from the light-emitting device A240, and in place of them, a microprocessor A250, a driver power supply A260, and a microprocessor power supply A270 are provided outside the light-emitting device A240.

FIGS. 20A and 20B are application diagrams each showing a vehicle as a third conventional example. The vehicle A300 in FIG. 20A includes a battery A310, a power switch A320, a controller A330, and a light-emitting device A340. The light-emitting device A340 is provided with a sequential lighting function as mentioned above, and includes a light-emitting element driving device A341, m light-emitting elements A342(1) to (m) connected in series, a switch driving device A343 for switching the light-emitting elements A342(1) to (m) individually between a short-circuited state and a non-short-circuited state, a microprocessor A344 for controlling the switch driving device A343, and a microprocessor power supply A345 for supplying electric power to the microprocessor A344 and the switch driving device A343.

On the other hand, in the vehicle A300 in FIG. 20B, the microprocessor A344 and the microprocessor power supply A345 mentioned above are omitted from the light-emitting device A340, and in place of them, a microprocessor A350 and a microprocessor power supply A360 are provided outside the light-emitting device A340.

An example of conventional technology related to what has been discussed above is seen, for example, in Patent Document 1 identified below.

LIST OF CITATIONS

Patent Literature

Patent Document 1: Japanese Patent Application published as No. 2008-091311

SUMMARY OF THE INVENTION

Technical Problem

Certainly, with a light-emitting device adopting sequential lighting (the second and third conventional examples), as compared with a light-emitting device adopting simple lighting (the first conventional example), it is possible to give a vehicle a better-looking design and augmented safety. For example, a turn lamp of which the segments are lit sequentially according to the direction of a vehicle's turn permits passengers and other vehicles easy, intuitive recognition of the vehicle's traveling direction.

However, in the light-emitting device A240 of the second conventional example, for the m light-emitting elements A242(1) to (m), the m light-emitting element driving devices A241(1) to (m) are provided one-to-one. This results in an increased number of components, an increased circuit board area, and poor power consumption efficiency.

Moreover, in the light-emitting device A240 of the second conventional example, controlling the m light-emitting element driving devices A241(1) to (m) requires the microprocessor A243 (or A250). This requires, in addition to the driver power supply A244 (or A260), the microprocessor power supply A345 (or A270), and also requires associated work such as the designing of software.

Furthermore, in the light-emitting device A240 of the second conventional example, transmitting control signals from the microprocessor A243 (or A250) to the light-emitting element driving devices A241(1) to (m) requires at least m control lines. Thus, in particular in a case where the microprocessor A250 is provided outside the light-emitting device A240, an increased number of leads need to be accommodated in a harness, and in addition increased work is needed to deal with EMC tests, verify modes of abnormality, etc.

In the light-emitting device A340 of the third conventional example, the driving current can be supplied from the single light-emitting element driving device A341 to the m light-emitting elements A342(1) to (m) connected in series, and this helps reduce the number of components and the circuit board area as compared with the second conventional example.

However, also in the light-emitting device A340 of the third conventional example, controlling the switch driving device A343 still requires the microprocessor A344 (or A350), and thus a problem similar to that with the second conventional example is left unsolved.

In view of the problems encountered by the present inventors, an object of the invention disclosed herein is to provide a switch driving device that achieves sequential lighting control of light-emitting elements without requiring control by a microprocessor, and to provide a light-emitting device and a vehicle that employ such a switch driving device.

Means for Solving the Problem

According to one aspect of what is disclosed herein, a switch driving device includes: switch elements for a plurality of channels connected in parallel with a plurality of light-emitting elements, respectively, included in a vehicle-mounted light-emitting device; and a logic circuit configured to automatically start, in response to electric power starting to be supplied to the device, a switch driving sequence to switch the ON/OFF states of the switch elements sequentially in a predetermined pattern (a first configuration).

The switch driving device according to the first configuration described above may further include: a start delay circuit configured to set the start delay time of the switch driving sequence arbitrarily by use of an externally-fitted element (a second configuration).

In the switch driving device according to the first or second configuration described above, the logic circuit may be configured to output a current supply start trigger for each of the light-emitting elements to a light-emitting element driving device external to the device after the expiry of an unstable-operation period of each of the switch elements before starting the switch driving sequence (a third configuration).

The switch driving device according to any one of the first to third configurations described above may further include: a frequency setter configured to set the operating frequency of the switch driving sequence by use of an externally-fitted element (a fourth configuration).

In the switch driving device according to any one of the first to fourth configuration described above, the logic circuit may be configured to output a suspension cancellation trigger to another switch driving device after the completion of the switch driving sequence (a fifth configuration).

In the switch driving device according to any one of the first to fifth configuration described above, the logic circuit may be configured to recognize the number of lit light-emitting elements according to a voltage at an external terminal (a sixth configuration).

In the switch driving device according to any one of the first to sixth configuration described above, the logic circuit may be configured to operate not only in a sequential-lighting mode in which the logic circuit drives the switch elements sequentially according to the switch driving sequence but also in an all-lit mode in which the logic circuit turns all the switch elements OFF simultaneously (a seventh configuration).

In the switch driving device according to the seventh configuration described above, the logic circuit may be configured, in the sequential-lighting mode, to perform the switch driving sequence in synchronism with a first clock signal and, in the all-lit mode, to perform the switch driving sequence in synchronism with a second clock signal with a higher frequency than the frequency of the first clock signal (an eighth configuration).

The switch driving device according to the eighth configuration described above may further include: a driver circuit configured to drive the plurality of switch elements individually; a charge pump configured to supply the driver circuit with a stepped-up voltage; and an oscillator configured to generate an internal clock signal needed for the charge pump to operate, wherein the internal clock signal is used as the second clock signal (a ninth configuration).

In the switch driving device according to any one of the seventh to ninth configuration described above, the logic circuit may be configured to turn all the switch elements OFF simultaneously in the all-lit mode when a hazard signal is fed in from outside the device or when an abnormality in the switch driving sequence is detected (a tenth configuration).

The switch driving device according to any one of the first to tenth configurations described above may further include: a watchdog timer configured to monitor for an abnormality in the start delay time or the operating frequency of the switch driving sequence (an eleventh configuration).

According to another aspect of what is disclosed herein, a light-emitting device includes: a plurality of light-emitting elements; a light-emitting element driving device configured to generate a driving current for each of the light-emitting elements; and the switch driving device according to any one of the first to eleventh configurations described above (a twelfth configuration).

In the light-emitting device according to the twelfth configuration described above, the plurality of light-emitting elements may each be a light-emitting diode or an organic electroluminescence element (a thirteenth configuration).

The light-emitting device according to the twelfth or thirteenth configuration described above may be mounted on a vehicle as a headlamp module, a turn lamp module, or a rear lamp module (a fourteenth configuration).

According to yet another aspect of what is disclosed herein, a vehicle includes: the light-emitting device according to any one of the twelfth to fourteenth configurations described above (a fifteenth configuration).

In the vehicle according to the fifteenth configuration described above, the light-emitting device may be used as at least one of a headlamp, a daytime running lamp, a tail lamp, a stop lamp, and a turn lamp (a sixteenth configuration).

Advantageous Effects of the Invention

According to the invention disclosed herein, it is possible to provide a switch driving device that achieves sequential lighting control of light-emitting elements without requiring control by a microprocessor, and to provide a light-emitting device and a vehicle that employ such a switch driving device.

BRIEF DESCRIPTION OF DRAWINGS

FIG. 11 is a table showing a relationship between a SEL terminal voltage and the number of light-emitting elements lit;

DESCRIPTION OF EMBODIMENTS

<Overall Configuration>

Figure 1:
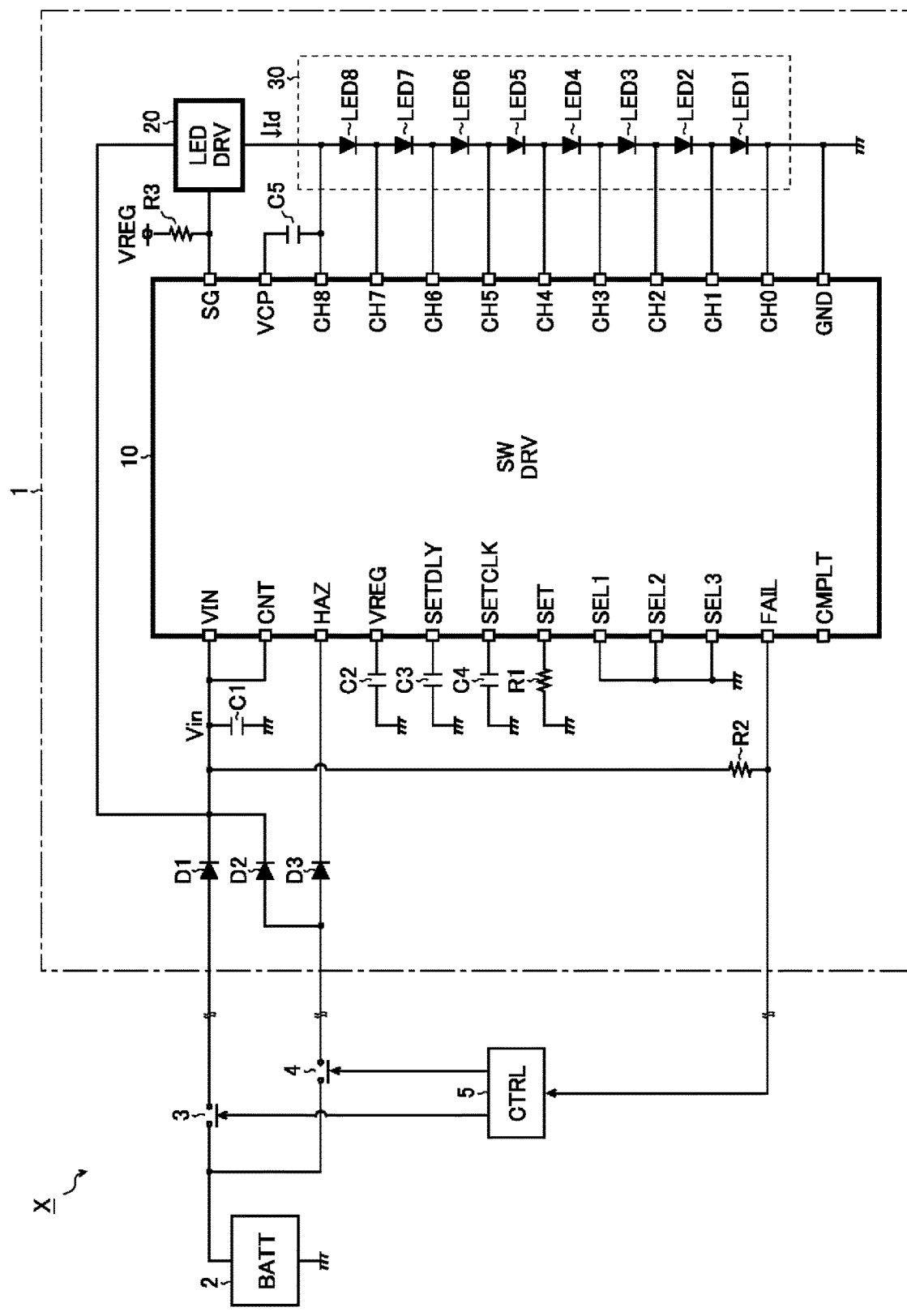
FIG. 1 is an application diagram showing an example of the overall configuration of a vehicle incorporating a light-emitting device.

FIG. 1 is an application diagram showing an example of the overall configuration of a vehicle X incorporating a light-emitting device 1. The vehicle X of this configuration example includes a light-emitting device 1, a battery 2, power switches 3 and 4, and a controller 5.

The light-emitting device 1 is a turn lamp that is blinked when the vehicle X makes a right or left turn or changes lanes, or a hazard lamp that is blinked in case of a hazard.

The battery 2 is an electric power source in the vehicle X, and for it, a lead battery is suitably used.

The power switches 3 and 4 are connected between the light-emitting device 1 and the battery 2, and are turned ON and OFF by being controlled by the controller 5.

The controller 5 controls the ON/OFF state of the power switch 3 according to the operation of a turn lever, and controls the ON/OFF state of the power switch 4 according to the operation of a hazard button. For example, in a case where the light-emitting device 1 is a turn lamp for right turn, so long as the turn lever is held in the right-turn position, the controller 5 turns the power switch 3 ON and OFF periodically to supply electric power to the light-emitting device 1 intermittently. Likewise, in a case where the light-emitting device 1 is a turn lamp for left turn, so long as the turn lever is held in the left-turn position, the controller 5 turns the power switch 3 ON and OFF periodically to supply electric power to the light-emitting device 1 intermittently. On the other hand, so long as the hazard button is held depressed, irrespective of whether the light-emitting device 1 is a right- or left-turn lamp, the controller 5 turns the power switch 4 ON and OFF periodically to supply electric power to the light-emitting device 1 intermittently. The controller 5 is also has the function of monitoring an abnormality flag of the light-emitting device 1 (the voltage at a FAIL terminal of a switch driving device 10) to alert the driver to the abnormality.

<Light-Emitting Device>

With reference to FIG. 1 as thus far, the internal configuration of the light-emitting device 1 will be described. The light-emitting device 1 includes a switch driving device 10, a light-emitting element driving device 20, a light-emitting element array 30, and various discrete components (resistors R1 to R3, capacitors C1 to C5, and diodes D1 to D3).

The switch driving device 10 is a semiconductor integrated circuit device (so-called matrix switch driver IC) that operates by being supplied with an input voltage Vin from the battery 2 to switch light-emitting diodes LED1 to LED8 constituting the light-emitting element array 30 individually between a short-circuited state and a non-short-circuited state. The switch driving device 10 is provided with, as means for establishing electrical connection with outside it, a plurality of external terminals (a VIN terminal, a CNT terminal, a HAZ terminal, a VREG terminal, a SETDLY terminal a SETCLK terminal, a SET terminal, SEL1 to SEL3 terminals, a FAIL terminal, a CMPLT terminal, a SG terminal, a VCP terminal, CH0 to CH8 terminals, and a GND terminal).

The light-emitting element driving device 20 is a semiconductor integrated circuit device (so-called light-emitting diode driver IC) that operates by being supplied with the input voltage Vin from the battery 2 to generate a driving current Id for the light-emitting element array 30 (light-emitting diodes LED1 to LED8). The light-emitting element driving device 20 is provided with the function of monitoring the SG terminal voltage of the switch driving device 10

(the voltage serving as a current supply start trigger) to suspend the start of the supply of the driving current Id until an unstable-operation period of the switch driving device 10 expires.

The light-emitting element array 30 is a serial light-emitting body (so-called LED string) that includes a plurality of light-emitting elements (in the illustrated example, up to eight light-emitting diodes LED1 to LED8) connected in series between the light-emitting element driving device 20 and a ground terminal. When the light-emitting diodes LED1 to LED8 are considered individually, each can be understood as a single light-emitting diode element, or a plurality of them combined in series or in parallel can be understood as a set of light-emitting elements.

Next, the interconnection among the various discrete components and the external terminals of the switch driving device 10 will be described. The anode of the diode D1 is connected to the first terminal of the power switch 3. The anodes of the diodes D2 and D3 are both connected to the first terminal of the power switch 4. The second terminals of the power switches 3 and 4 are both connected to the positive terminal of the battery 2. The cathodes of the diodes D1 and D2 are both connected to the VIN terminal of the switch driving device 10 and also to the power terminal of the light-emitting element driving device 20. The cathode of the diode D3 is connected to the HAZ terminal.

The capacitor C1 is connected between the VIN terminal and the ground terminal. The capacitor C2 is connected between the VREG terminal and the ground terminal. The capacitor C3 is connected between the SETDLY terminal and the ground terminal. The capacitor C4 is connected between the SETCLK terminal and the ground terminal. The capacitor C5 is connected between the VCP terminal and CH8 terminal.

The resistor R1 is connected between the SET terminal and the ground terminal. The resistor R2 is connected between the VIN terminal and the FAIL terminal. The resistor R3 is connected between the VREG terminal and the SG terminal.

The CH0 terminal and the GND terminal of the switch driving device 10 are both connected to the cathode (ground terminal) of the light-emitting diode LED1. The CH(k) terminal (where k=1, 2, . . . , 7) of the switch driving device 10 is connected to the anode of the light-emitting diode LED(k) and to the cathode of the light-emitting diode LED(k+1). The CH8 terminal of the switch driving device 10 is connected to the anode of the light-emitting diode LED8.

The CNT terminal of the switch driving device 10 is connected to the VIN terminal. The SEL1 to SEL3 terminals are all connected to the ground terminal. The CMPLT terminal is left in an open state. The significance of the interconnection described above will become clear in the course of the following descriptions.

In performing sequential lighting control of the light-emitting diodes LED1 to LED8, the switch driving device 10 does not require any control signal from a microprocessor (the details will be given later). Accordingly, unlike with the conventional configurations (see FIGS. 19A, 19B, 20A, and 20B), there is no need to provide a microprocessor or a power supply for it; this helps reduce the number of components of the light-emitting device 1. It is also possible to greatly reduce the number of leads in the harness connected to the light-emitting device 1; this not only allows easy set designing but also helps alleviate the work for dealing with EMC tests, verifying modes of abnormality, etc.

A detailed description will now be given, with reference to the relevant drawings, of the internal configuration and operation of a switch driving device 10 that can perform sequential lighting control similar to that conventionally practiced without requiring control by a microprocessor.

<Switch Driving Device>

Figure 2:
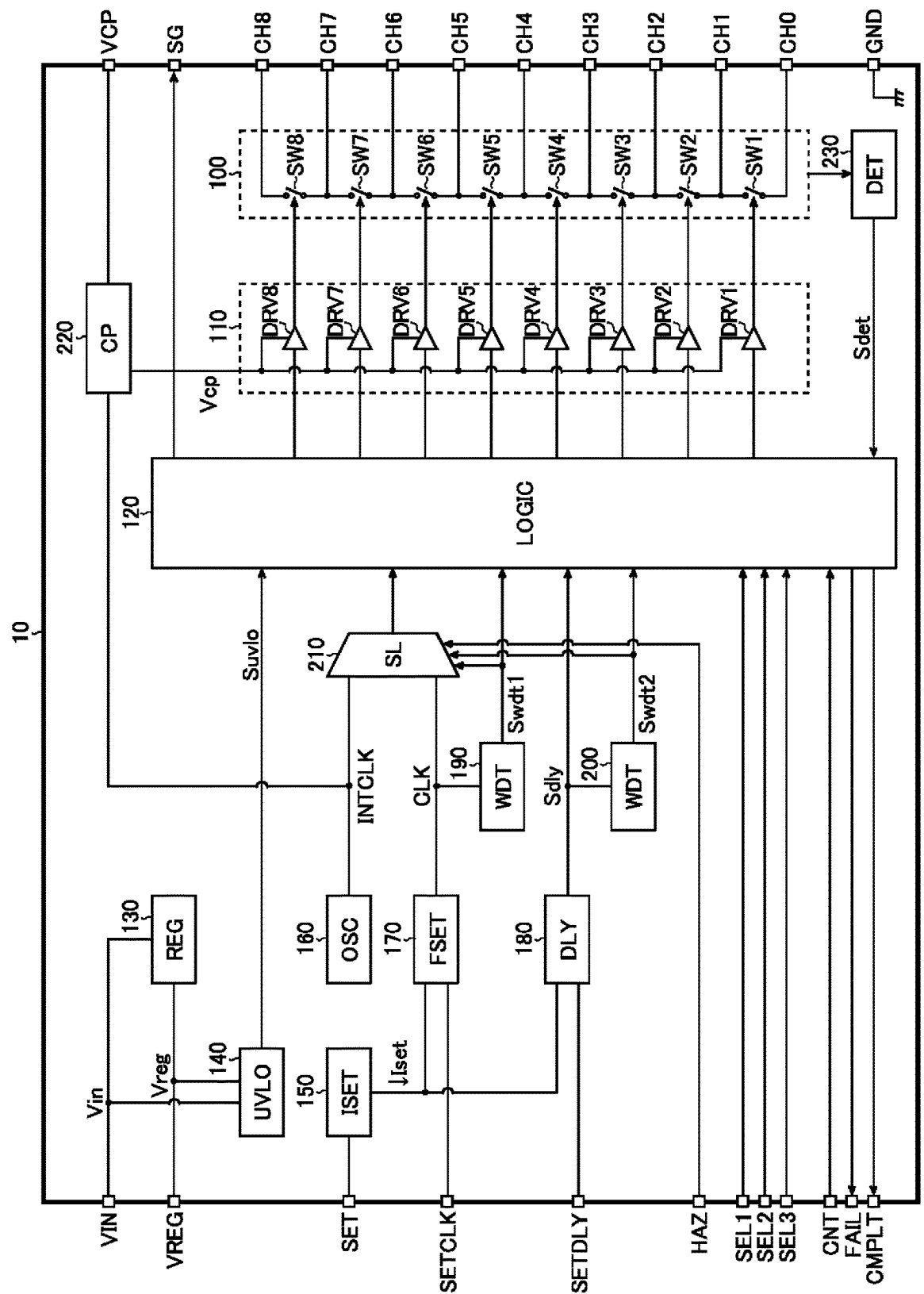
FIG. 2 is a block diagram showing an example of the internal configuration of a switch driving device.

FIG. 2 is a block diagram showing an example of the internal configuration of the switch driving device 10. The switch driving device 10 of this configuration example includes a switch circuit 100, a driver circuit 110, a logic circuit 120, an internal regulator 130, an UVLO (undervoltage lockout) circuit 140, a current setter 150, an oscillator 160, a frequency setter 170, a start delay circuit 180, a first watchdog timer 190, a second watchdog timer 200, a selector 210, a charge pump 220, and an open/short detector 230. Although, for the sake of convenience of illustration, the arrangement of external terminals differ between FIGS. 1 and 2, the terminals with the same designations correspond to each other.

The switch circuit 100 includes switch elements SW1 to SW8 for a plurality of channels (in the illustrated example, eight channels). Each switch element SWx (where x=1, 2, . . . , 8) is connected between the CH(x−1) terminal and the CH(x) terminal. Thus, when the light-emitting diode LEDx is externally fitted between the CH(x−1) terminal and the CH(x) terminal, the switch element SWx is connected in parallel with the light-emitting diode LEDx. Accordingly, in the ON period of the switch element SWx, the light-emitting diode LEDx is short-circuited across it, and is thus in a lighting-disabled state. On the other hand, in the OFF period of the switch element SWx, the light-emitting diode LEDx is not short-circuited across it, and is thus in a lighting-enabled state.

The driver circuit 110 includes drivers DRV1 to DRV8 that drive the switch elements SW1 to SW8 respectively in response to instructions from the logic circuit 120. The drivers DRV1 to DRV8 operate by being supplied with a stepped-up voltage Vcp from the charge pump 220.

The logic circuit 120 is provided with, as its chief function, the function of automatically starting a switch driving sequence such that the ON/OFF states of the switch elements SW1 to SW8 are switched sequentially in a pre-determined pattern in response to electric power starting to be supplied to the switch driving device 10 (more precisely, in response to an UVLO signal Suvlo turning to a logic level corresponding to undervoltage absence. Other than this, the logic circuit 120 is provided with various functions, which will be described in detail later.

The internal regulator 130 steps down the input voltage Vin applied to the VIN terminal to generate a predetermined constant voltage Vreg (for example, 5 V), and feeds it to the VREG terminal. Suitably usable as the internal regulator 130 is an LDO (low-dropout) regulator or a switching regulator).

The UVLO circuit 140 monitors both the input voltage Vin and the constant voltage Vreg (or one of these) to generate the UVLO signal Suvlo, and feeds this to the UVLO circuit 140. The UVLO signal Suvlo is at a logic level corresponding to undervoltage absence when the input voltage Vin and the constant voltage Vreg are higher than their respective undervoltage-absence voltages, and is at a logic level corresponding to undervoltage presence when the input voltage Vin and the constant voltage Vreg are lower than their respective undervoltage-presence voltages (<the undervoltage-absence voltages).

The current setter 150 generates a predetermined reference current Iset, and feeds it to the frequency setter 170 and the start delay circuit 180. The current value of the reference current Iset can be adjusted by controlling the resistance value of the resistor R1 (see FIG. 1) externally fitted to the current setter 150.

The oscillator 160 generates an internal clock signal INTCLK (for example, 2 MHz) which is necessary for the charge pump 220 to operate. The internal clock signal INTCLK is fed not only to the charge pump 220 but also to the selector 210.

The frequency setter 170 sets the operating frequency of the switch driving sequence arbitrarily by use of an externally-fitted element. Specifically, the frequency setter 170 generates a variable clock signal CLK (for example, 500 Hz to 50 kHz) of which the frequency varies with the capacitance value of the capacitor C4 (see FIG. 1) externally fitted to the SETCLK terminal and the current value of the reference current Iset (hence the resistance value of the resistor R1 externally fitted to the SET terminal), and feeds the variable clock signal CLK to the selector 210.

The start delay circuit 180 sets a start delay time tDLY of the switch driving sequence arbitrarily by use of an externally-fitted element. Specifically, the start delay circuit 180 generates a start delay signal Sdly of which the logic transition timing varies with the capacitor C3 (see FIG. 1) externally fitted to the SETDLY terminal and the current value of the reference current Iset (hence the resistance value of the resistor R1 externally fitted to the SET terminal), and feeds the start delay signal Sdly to the logic circuit 120.

The first watchdog timer 190 monitors for an abnormality in the operating frequency of the switch driving sequence. Specifically, the first watchdog timer 190 monitors the variable clock signal CLK to generate a first abnormality detection signal Swdt1, and feeds it to the logic circuit 120 and to the selector 210. The first abnormality detection signal Swdt1 is, for example, at HIGH level when an abnormality is detected, and is at LOW level when no abnormality is detected.

The second watchdog timer 200 monitors for an abnormality in the start delay time tDLY of the switch driving sequence. Specifically, the second watchdog timer 200 monitors the start delay signal Sdly to generate a second abnormality detection signal Swdt2, and feeds it to the logic circuit 120 and to the selector 210. The second abnormality detection signal Swdt2 is, for example, at HIGH level when an abnormality is detected, and is at LOW level when no abnormality is detected.

The selector 210 feeds the logic circuit 120 selectively with either the internal clock signal INTCLK or the variable clock signal CLK. More specifically, when the HAZ terminal voltage is at LOW level (=the logic level corresponding to the hazard lamp in a non-lit state) and in addition the first and second abnormality detection signals Swdt1 and Swdt2 are both at HIGH level (=the logic level corresponding to abnormality absence), the selector 210 selectively feeds the variable clock signal CLK to the logic circuit 120. On the other hand, when the HAZ terminal voltage is at HIGH level (=the logic level corresponding to the hazard lamp in a lit state) or at least one of the first and second abnormality detection signals Swdt1 and Swdt2 is at LOW level (=the logic level corresponding to abnormality presence), the selector 210 selectively feeds the internal clock signal INTCLK to the logic circuit 120.

The charge pump 220 generates the stepped-up voltage Vcp by using the capacitor C5 (see FIG. 1) externally fitted to the VCP terminal, and feeds the stepped-up voltage Vcp to the driver circuit 110.

The open/short detector 230 monitors the node voltages appearing at the CH0 to CH8 terminals respectively to generate an open/short detection signal Sdet, and feeds it to the logic circuit 120. The open/short detection signal Sdet is at a logic level (for example, HIGH level) corresponding to abnormality absence when no abnormality is recognized in any of the light-emitting diodes LED1 to LED8, and is at a logic level (for example, LOW level) corresponding to abnormality presence when an abnormality is recognized in at least one of the light-emitting diodes LED1 to LED8.

<Switch Driving Sequence>

Figure 3:
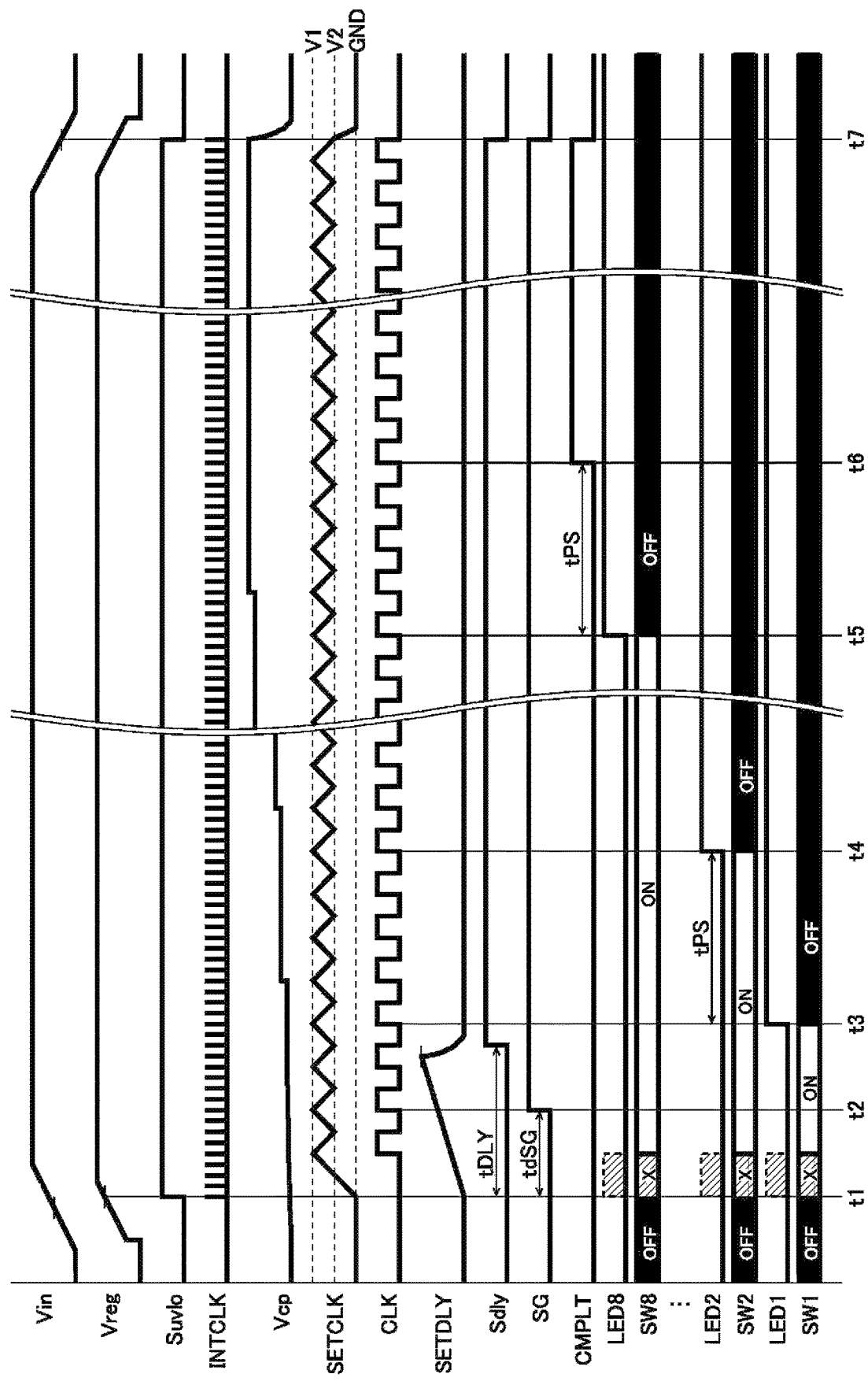
FIG. 3 is a timing chart showing one example of a switch driving sequence.

FIG. 3 is a timing chart showing one example of the switch driving sequence, depicting, from top down, the input voltage Vin, the constant voltage Vreg, the UVLO signal Suvlo, the internal clock signal INTCLK, the stepped-up voltage Vcp, the SETCLK terminal voltage, the variable clock signal CLK, the SETDLY terminal voltage, the start delay signal Sdly, the SG terminal voltage, the CMPLT terminal voltage, and the lit/extinguished states (H: lit; L: extinguished) of the light-emitting diodes LED* (where *=8, 7, . . . , 1).

For the sake of convenience of illustration, pulses in the internal clock signal INTCLK and the variable clock signal CLK are shown to be larger than they actually are. Accordingly, the time widths of the start delay time tDLY, a current supply suspension time tdSG, and lighting transition times tPS in FIG. 3 do not necessarily match the pulse counts.

After the switch driving device 10 starts to be supplied with electric power, at time point t1, when the UVLO signal Suvlo rises to HIGH level (=the logic level corresponding to undervoltage absence), the internal clock signal INTCLK and the variable clock signal CLK start to be generated, and the blocks constituting the switch driving device 10 come into an operable state.

Then, the logic circuit 120 controls the driver circuit 110 so as to initialize the switch elements SW1 to SW8 from an OFF state, in which they have been up to then, to an ON state. At time point t1, however, the charge pump 220 has just started voltage step-up operation, and thus the output operation of the driver circuit 110 is unstable; this produces an indefinite operation period (the hatched regions marked with crosses (X)) in the switch elements SW1 to SW8. Thus, if the light-emitting element driving device 20 outputs the driving current Id before the expiry of the indefinite operation period, the light-emitting diodes LED1 to LED8 may be lit instantaneously without being so intended.

To prevent that, after the expiry of the indefinite operation period of the switch elements SW1 to SW8, before the start of the switch driving sequence, the logic circuit 120 feeds the light-emitting element driving device 20 outside the device with a current supply start trigger directed to the light-emitting diodes LED1 to LED8. More specifically, throughout the indefinite operation period of the switch elements SW1 to SW8, the logic circuit 120 keeps the SG terminal voltage at LOW level (=the logic level corresponding to current supply suspension in effect), and at the time point that the current supply suspension time tdSG has elapsed after time point t1, that is, at time point t2, the logic circuit 120 raises the SG terminal voltage from LOW level to HIGH level (=the logic level corresponding to current supply suspension canceled).

With this configuration, during the indefinite operation period of the switch elements SW1 to SW8, the light-emitting element driving device 20 does not output the driving current Id, and it is thus possible to prevent the light-emitting diodes LED1 to LED8 from being lit instantaneously.

The timing of the output of the current supply start trigger may be at the time point that the current supply suspension time tdSG has elapsed after time point t1 as mentioned above, or may be at the time point that the output level of the drivers DRV1 to DRV8 exceeds a predetermined threshold value.

Thereafter, when the predetermined start delay time tDLY has elapsed after time point t1 and the start delay signal Sdly rises to HIGH level, the logic circuit 120 turns OFF the switch elements SW1 to SW8 sequentially in a cumulative manner, starting at time point t3 and every lighting transition time tPS based on the variable clock signal CLK. For example, the lighting transition time tPS can be set equivalent to 256 counts of the variable clock signal CLK. In that case, if the oscillation frequency of the variable clock signal CLK is 5.12 kHz, the lighting transition time tPS is 50 ms.

As a result of the switch elements SW1 to SW8 being turned OFF sequentially in a cumulative manner, the number of lit ones of the light-emitting diodes LED1 to LED8 increases gradually, and thus the area of the lit region increases with time. That is, when one switch driving sequence is complete, the switch elements SW1 to SW8 are all OFF, and thus the light-emitting diodes LED1 to LED8 are all lit. It is also possible to make the lit region appear to run by turning OFF the switch elements SW1 to SW8 sequentially in an exclusive manner.

After all the switch elements SW1 to SW8 are now OFF at time point t5, when another lighting transition time tPS elapses, that is, at time point t6, the logic circuit 120 raises the CMPLT terminal voltage to HIGH level. The CMPLT terminal is an external terminal that is used when a plurality of switch driving circuits 10 are connected in series, and its function will be described in detail later.

Thereafter, when the switch driving device 10 stops being supplied with electric power, at time point t7, the UVLO signal Suvlo falls to LOW level (=the logic level corresponding to undervoltage presence), with the result that the internal clock signal INTCLK and the variable clock signal CLK stop being generated, and the blocks constituting the switch driving device 10 go into an inoperable state. At this point, the switch elements SW1 to SW8 are already OFF, and thus no instantaneous lighting occurs as when electric power starts to be supplied.

The switch driving sequence described above is performed each time the switch driving device 10 starts and stops being supplied with electric power as a result of the power switch 3 or 4 being turned ON and OFF periodically.

<Start Delay Circuit>

Figure 4:
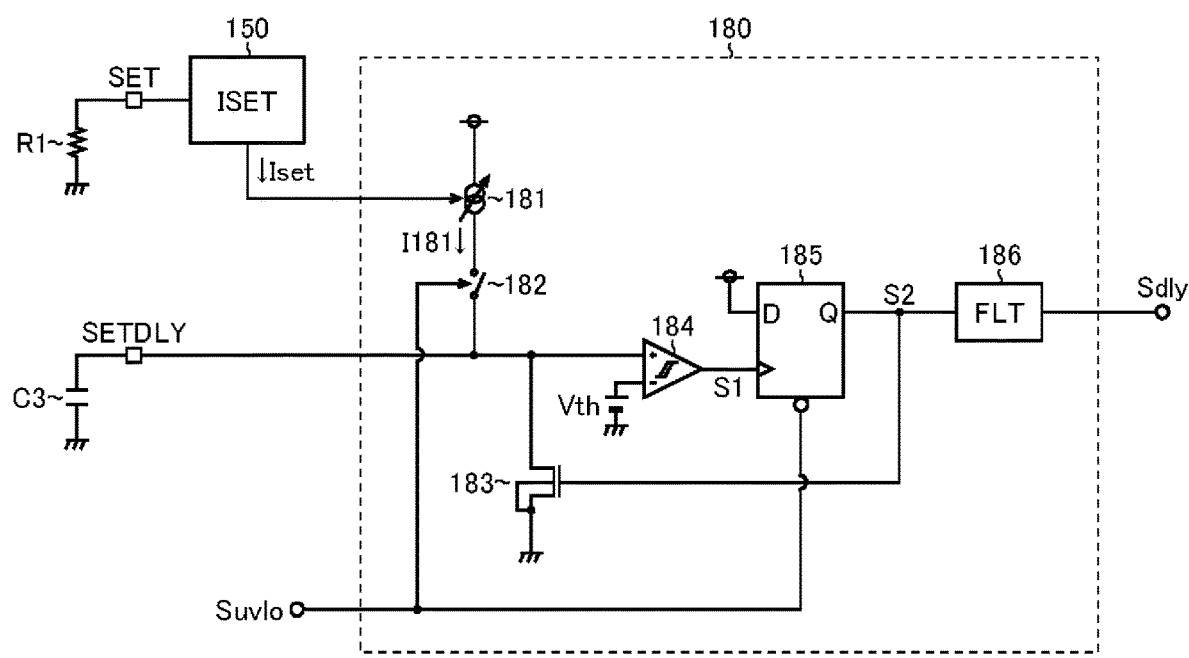
FIG. 4 is a circuit diagram showing an example of the internal configuration of a start delay circuit.

FIG. 4 is a circuit diagram showing an example of the internal configuration of the start delay circuit 180. The start delay circuit 180 includes a current source 181, a switch 182, an N-channel MOS (metal-oxide-semiconductor) field effect transistor 183, a comparator 184, a D flip-flop 185, and a filter 186.

The current source 181 generates a constant current I181 commensurate with the reference current Iset. The first terminal of the current source 181 is connected to a power terminal (for example, a terminal to which the constant voltage Vreg is applied). The second terminal of the current source 181 is connected via the switch 182 to the SETDLY terminal.

The switch 182 switches the path between the second terminal of the current source 181 and the SETDLY terminal between a conducting state and a cut-off state according to the UVLO signal Suvlo. The switch 182 is ON when the UVLO signal Suvlo is at a logic level (for example, HIGH level) corresponding to undervoltage absence, and is OFF when the UVLO signal Suvlo is at a logic level (for example, HIGH level) corresponding to undervoltage presence.

The transistor 183 functions as a discharge switch for the capacitor C3 externally fitted to the SETDLY terminal. The drain of the transistor 183 is connected to the SETDLY terminal. The source and the back gate of the transistor 183 are both connected to the ground terminal. The gate of the transistor 183 is connected to the output terminal (Q) of the D flip-flop 185. The transistor 183 is ON when a latch signal S2 (the output signal of the D flip-flop 185) is at HIGH level, and is OFF when the latch signal S2 is at LOW level.

The comparator 184 generates a comparison signal S1 by comparing the SETDLY terminal voltage (the charge voltage of the capacitor C3), which is fed to the non-inverting input terminal (+) of the comparator 184, with a threshold voltage Vth, which is fed to the inverting input terminal (−) of the comparator 184. The comparison signal S1 is at HIGH level when the SETDLY terminal voltage is higher than the threshold voltage Vth, and is at LOW level when the SETDLY terminal voltage is lower than the threshold voltage Vth. The comparator 184 can preferably be given hysteresis for higher resistance to noise.

The D flip-flop 185, by being triggered by a rising edge in the comparison signal S1, which is fed to the clock terminal of the D flip-flop 185, takes in a data signal (constant at HIGH level), which is fed to the data terminal (D) of the D flip-flop 185, and outputs it as the latch signal S2 from the output terminal (Q) of the D flip-flop 185. On the other hand, the D flip-flop 185 resets the latch signal S2 to LOW level when the UVLO signal Suvlo, which is fed to the reset terminal of the D flip-flop 185, is at LOW level.

The filter 186 generates the start delay signal Sdly by eliminating from the latch signal S2 the noise components contained in it.

Figure 5:
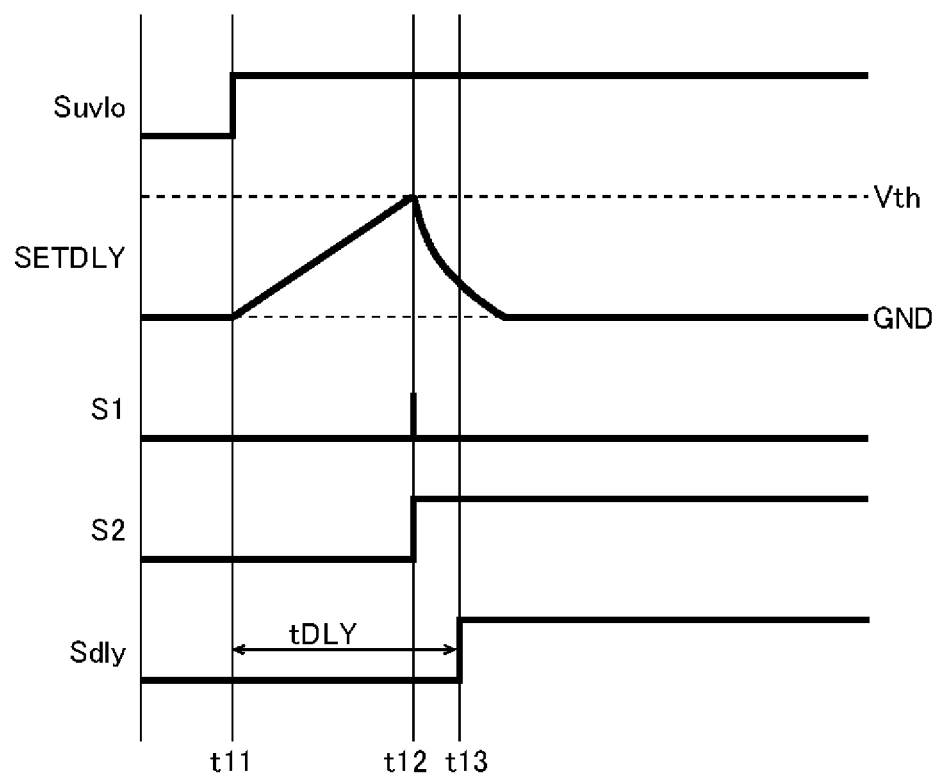
FIG. 5 is a timing chart showing one example of start delay operation.

FIG. 5 is a timing chart showing one example of start delay operation (the chart being an enlarged view between time points t1 and t3 in FIG. 1), depicting, from top down, the UVLO signal Suvlo, the SETDLY terminal voltage, the comparison signal S1, the latch signal S2, and the start delay signal Sdly.

At time point t11, when the UVLO signal Suvlo rises to HIGH level, the switch 182 turns ON. At this point, the latch signal S2 is at LOW level, and the transistor 183 is OFF. Accordingly, the capacitor C3 is charged with the constant current I181, and thus the SETDLY terminal voltage starts to increase.

At time point t12, when the SETDLY terminal voltage becomes higher than the threshold voltage Vth, the comparison signal S1 rises to HIGH level, and the latch signal S2 is latched at HIGH level. At this point, the transistor 183 turns ON, and the capacitor C3 is discharged; thus, the SETDLY terminal voltage now starts to decrease.

Thereafter, at time point t13, when the start delay signal Sdly having undergone filtering rises to HIGH level, the logic circuit 120 starts the switch driving sequence (see FIG. 3). The time that elapses after the UVLO signal Suvlo rises to HIGH level until the start delay signal Sdly rises to HIGH level corresponds to the start delay time tDLY.

The start delay time tDLY can be adjusted arbitrarily by controlling the current value of the constant current I181 (hence the resistance value of the resistor R1) and the capacitance value of the capacitor C3. Accordingly, with the start delay circuit 180 of this configuration example, it is possible to set the start timing of the switch driving sequence arbitrarily by use of externally-fitted elements (the resistor R1 and the capacitor C3).

For example, in a case where use is made of a light-emitting element driving device 20 that takes a long time after it starts to be supplied with electric power until it starts up completely, the start delay time tDLY can be set accordingly longer. With such a setting, it is possible to prevent the switch driving sequence from being started prematurely before a sufficient driving current Id is supplied from the light-emitting element driving device 20 to the light-emitting element array 30. Needless to say, the start delay time tDLY needs to be set longer than the current supply suspension time tdSG. Alternatively, the "UVLO signal Suvlo" in FIG. 3 can be read as the "SG terminal voltage", in which case the expiry of a current supply suspension time tdSG (=a rising edge in the SG terminal voltage) can be used as a trigger that starts the counting of the start delay time tDLY (the charging of the SETDLY terminal voltage).

<Frequency Setter>

Figure 6A:
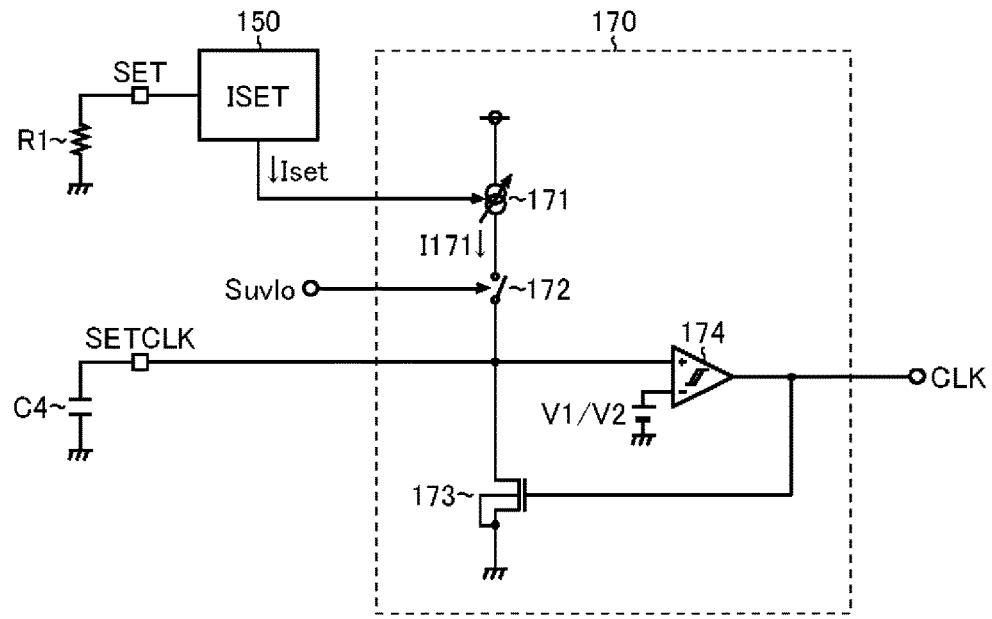
FIG. 6A is a circuit diagram showing an example of the internal configuration of a frequency setter.

FIG. 6A is a circuit diagram showing an example of the internal configuration of the frequency setter 170. The frequency setter 170 shown there includes a current source 171, a switch 172, an N-channel MOS field-effect transistor 173, and a comparator 174.

The current source 171 generates a constant current I171 commensurate with the reference current Iset. The first terminal of the current source 171 is connected to the power terminal (for example, the terminal to which the constant voltage Vreg is applied). The second terminal of the current source 171 is connected via the switch 172 to the SETCLK terminal.

The switch 172 switches the path between the second terminal of the current source 171 and the SETCLK terminal between a conducting state and a cut-off state according to the UVLO signal Suvlo. The switch 172 is ON when the UVLO signal Suvlo is at a logic level (for example, HIGH level) corresponding to undervoltage absence, and is OFF when the UVLO signal Suvlo is at a logic level (for example, LOW level) corresponding to undervoltage presence.

The transistor 173 functions as a discharge switch for the capacitor C4 externally fitted to the SETCLK terminal. The drain of the transistor 173 is connected to the SETCLK terminal. The source and the back gate of the transistor 173 are both connected to the ground terminal. The gate of the transistor 173 is connected to the output terminal of the comparator 174 (=the output terminal of the variable clock signal CLK). The transistor 173 is ON when the variable clock signal CLK (the output signal of the comparator 174) is at HIGH level, and is OFF when the variable clock signal CLK is at LOW level.

The comparator 174 generates the variable clock signal CLK by comparing the SETCLK terminal voltage (the charge voltage of the capacitor C4), which is fed to the non-inverting input terminal (+) of the comparator 174, with a threshold voltage V1 or V2 (where V1>V2; see FIG. 3 referred to previously), which is fed to the inverting input terminal (−) of the comparator 174. The variable clock signal CLK is at HIGH level when the SETCLK terminal voltage is higher than the threshold voltage V1, and is at LOW level when the SETDLY terminal voltage is lower than the threshold voltage V2. Thus, the comparator 174 is given hysteresis.

With reference to FIG. 3 referred to previously, the operation for generating the variable clock signal CLK will be described. At time point t1, when the UVLO signal Suvlo rises to HIGH level, the switch 172 turns ON. At this point, the variable clock signal CLK is at LOW level, and the transistor 173 is OFF. Accordingly, the capacitor C4 is charged with the constant current I171, and thus the SETCLK terminal voltage starts to increase.

When the SETCLK terminal voltage becomes higher than the threshold voltage V1, the variable clock signal CLK rises to HIGH level. At this point, the transistor 173 turns ON, and the capacitor C4 is discharged; thus, the SETCLK terminal voltage now starts to decrease.

Thereafter, when the SETCLK terminal voltage becomes lower than the threshold voltage V2, the variable clock signal CLK falls to LOW level. At this point, the transistor 173 turns OFF, and the capacitor C4 stops being discharged; thus, the SETCLK terminal voltage now starts to increase again.

Then, the capacitor C4 is repeatedly charged and discharged in the manner described above, so that the SETCLK terminal voltage increases and decreases between the threshold voltages V1 and V2, generating periodic pulses in the variable clock signal CLK.

The oscillation frequency of the variable clock signal CLK can be adjusted arbitrarily by controlling the current value of the constant current I171 (hence the resistance value of the resistor R1) and the capacitance value of the capacitor C4. The logic circuit 120 performs the above-described switch driving sequence in synchronism with the variable clock signal CLK. Thus, with the frequency setter 170 of this configuration example, the operating frequency of the switch driving sequence can be set arbitrarily by use of externally-fitted elements (the resistor R1 and the capacitor C4).

For example, the higher the oscillation frequency of the variable clock signal CLK, the shorter the lighting transition time tPS; the lower the operating frequency of the variable clock signal CLK, the longer the lighting transition time tPS. That is, with the frequency setter 170 of this configuration example, the sequential lighting control of the light-emitting diodes LED1 to LED8 can be performed at an arbitrary speed, and thus it is possible to flexibly cope with various user requirements.

Figure 6B:
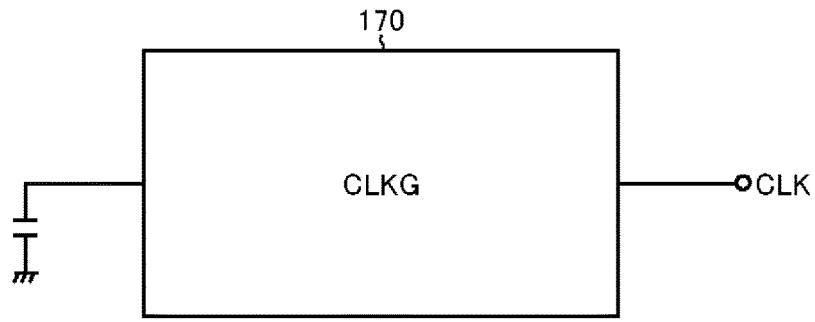
FIG. 6B is a circuit diagram showing a first modified example of the frequency setter.
Figure 6C:
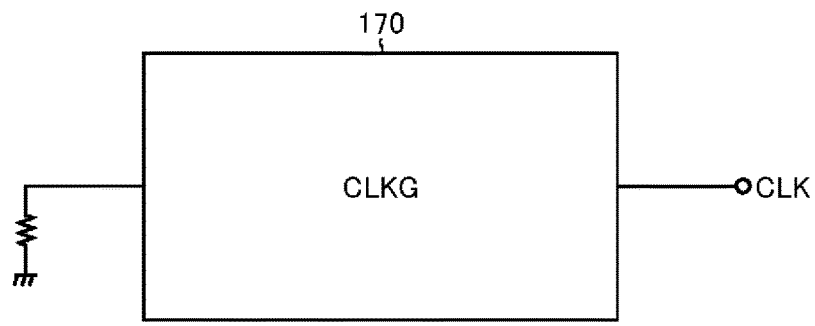
FIG. 6C is a circuit diagram showing a second modified example of the frequency setter.

Externally-fitted elements are not limited to those in the example shown in FIG. 6A; instead, for example, as shown in FIG. 6B, an externally fitted capacitor alone can be used to variably control the oscillation frequency of the variable clock signal CLK, or as shown in FIG. 6C, an externally fitted resistor alone can be used to variably control the oscillation frequency of the variable clock signal CLK.

<Multi-Stage Connection of Switch Driving Devices>

Figure 7:
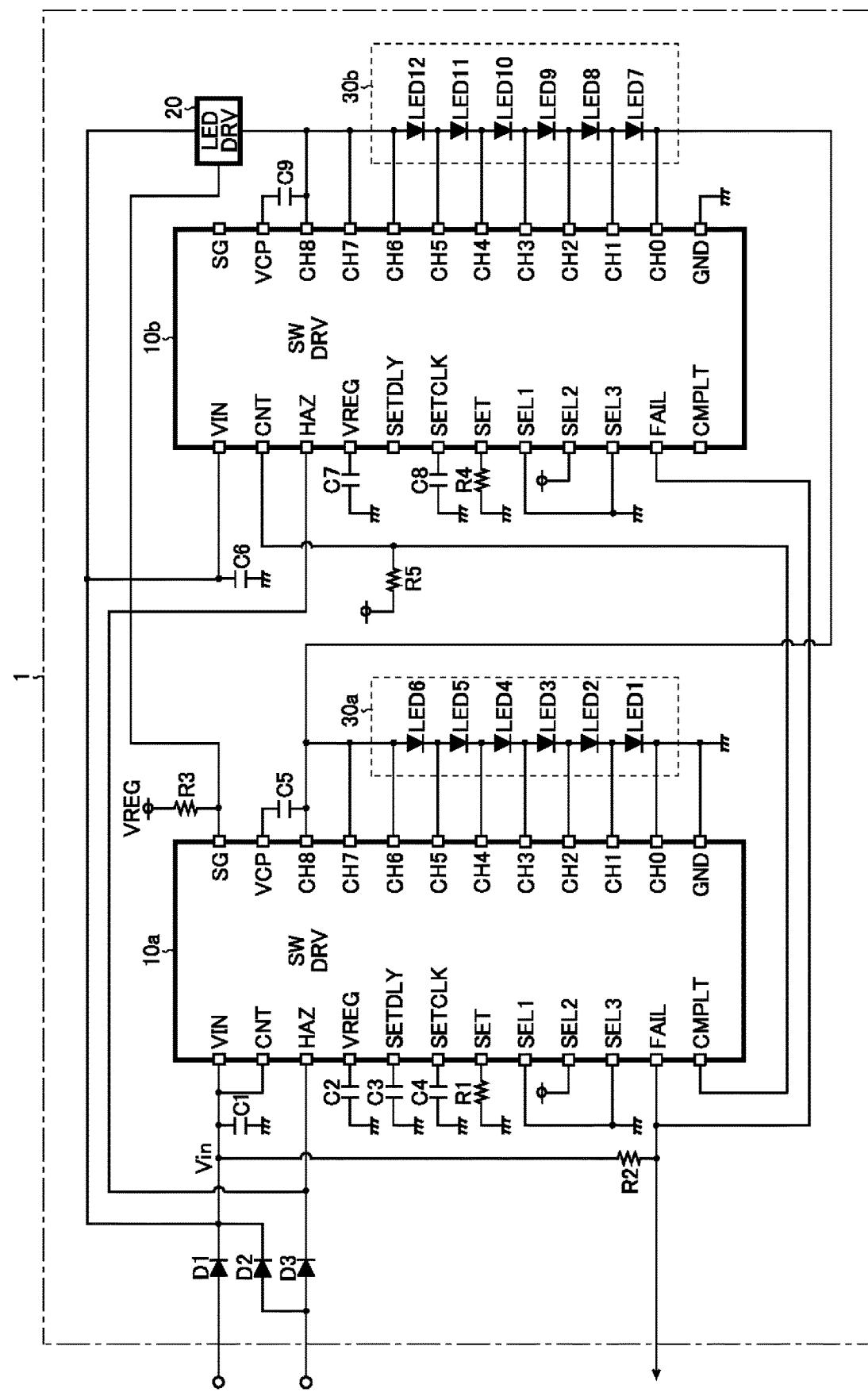
FIG. 7 is an application diagram showing an example of multi-stage connection of switch driving devices.

FIG. 7 is an application diagram showing an example of multi-stage connection of switch driving devices 10a and 10b. The light-emitting device 1 shown there includes switch driving devices 10a and 10b (each having an internal configuration similar to that of the switch driving device 10 (FIG. 2) described previously), a light-emitting element driving device 20, light-emitting element arrays 30a and 30b, and various discrete components (resistors R1 to R5, capacitors C1 to C9, and diodes D1 to D3). The following description focuses on differences from what is shown in FIG. 1 referred to previously.

The light-emitting element arrays 30a and 30b are connected in series between the light-emitting element driving device 20 and a ground terminal. The light-emitting element array 30a includes six light-emitting diodes LED1 to LED6. On the other hand, the light-emitting element array 30b includes six light-emitting diodes LED7 to LED12. The switch driving device 10a switches between a short-circuited state and a non-short-circuited state the light-emitting diodes LED1 to LED6 externally fitted respectively between every two adjacent ones of the CH0 to CH6 terminals. On the other hand, the switch driving device 10*b* switches between a short-circuited state and a non-short-circuited state the light-emitting diodes LED7 to LED12 externally fitted respectively between every two adjacent ones of the CH0 to CH6 terminals. In each of the switch driving devices 10*a* and 10*b*, any unused interval between adjacent channel terminals is short-circuited (between the CH6 and CH7 terminals and between the CH7 and CH8 terminals).

As described above, the 12 light-emitting diodes LED1 to LED12 are connected to the switch driving devices 10*a* and 10*b* in an evenly distributed fashion, six to each, with a view to evenly dispersing the heat they produce. This, however, is not meant to limit the proportion in which to distribute the light-emitting diodes LED1 to LED12; they may instead be connected to the switch driving devices 10*a* and 10*b* in an unevenly distributed fashion (for example, eight to one and four to the other).

In a case where six light-emitting diodes are connected to each of the switch driving devices 10*a* and 10*b*, the SEL1 and SEL3 terminals can be connected to the GND terminal and the SEL2 terminal can be connected to the VREG terminal. The significance of this interconnection will be described in detail later.

Next, the external connection of the switch driving devices 10*a* and 10*b* will be described. Here, the switch driving device 10*a* can be understood basically as being similar to the switch driving device 10 shown in FIG. 1; therefore, overlapping description will be minimized, and the following description focuses on and discusses in detail the external connection of the switch driving device 10*b* additionally provided in FIG. 7.

The capacitor C6 is connected between the VIN terminal of the switch driving device 10*b* and the ground terminal. The VIN terminal of the switch driving device 10*b* is connected to the cathodes of the diodes D1 and D2 (the terminal to which the input voltage Vin is applied). The HAZ terminal of the switch driving device 10*b* is connected to the cathode of the diode D3 (the terminal to which a hazard signal is fed). The capacitor C7 is connected between the VREG terminal of the switch driving device 10*b* and the ground terminal. The SETDLY terminal of the switch driving device 10*b* is, unlike that of the switch driving device 10*a* in the first stage, left in an open state. This is because, for the switch driving device 10 in a subsequent stage, there is no need to set the start delay time tDLY. The capacitor C8 is connected between the SETCLK terminal of the switch driving device 10*b* and the ground terminal. The capacitor C9 is connected between the VCP terminal of the switch driving device 10*b* and the CH8 terminal.

The resistor R4 is connected between the SET terminal of the switch driving device 10*b* and the ground terminal. The resistor R5 is connected to the CNT terminal of the switch driving device 10*b* and the power terminal (for example, the VREG terminal). The CNT terminal of the switch driving device 10*b* is connected to the CMPLT terminal of the switch driving device 10*a*. In this way, the switch driving devices 10*a* and 10*b* are connected together via a single serial signal line, by use of which their multiple-stage coordinated operation (=after the completion of the sequential lighting control of the light-emitting diodes LED1 to LED6 by the switch driving device 10*a*, the sequential lighting control of the light-emitting diodes LED7 to LED12 by the switch driving device 10*b* follows) is achieved. On the other hand, the CMPLT terminal of the switch driving device 10*b* is left in an open state.

As will be understood from the capacitors C4 and C8 externally fitted respectively to the SETCLK terminals of the switch driving devices 10*a* and 10*b*, in the switch driving devices 10*a* and 10*b*, their respective variable clock signals CLK are generated out of synchronism. With this configuration, there is no need to transfer a variable clock signal CLK from the switch driving device 10*a* to the switch driving device 10*b*, and thus the number of signal lines between them does not need to be increased. Moreover, even though the variable clock signals CLK in the switch driving devices 10*a* and 10*b* respectively are out of synchronism, so long as their multi-stage coordinate operation is in action via the serial signal line, there is almost no risk of so large a deviation in lighting timing as to be visually recognizable by a human.

As described previously, the light-emitting element driving device 20 monitors the SG terminal voltage of the switch driving device 10 to suspend the start of the supply of the driving current Id.

The FAIL terminal of the switch driving device 10*b* is connected to the FAIL terminal of the switch driving device 10*a*. The GND terminal of the switch driving device 10*b* is connected to the ground terminal.

As described above, by connecting the switch driving devices 10*a* and 10*b* in series and performing multi-stage coordinated operation (which will be described in detail later) between them, it is possible to light nine or more light-emitting diodes sequentially without increasing the number of channels in the switch driving devices 10*a* and 10*b*. It is thus possible to flexibly cope with various user requirements (different numbers of light-emitting elements needed in the light-emitting device 1).

Figure 8:
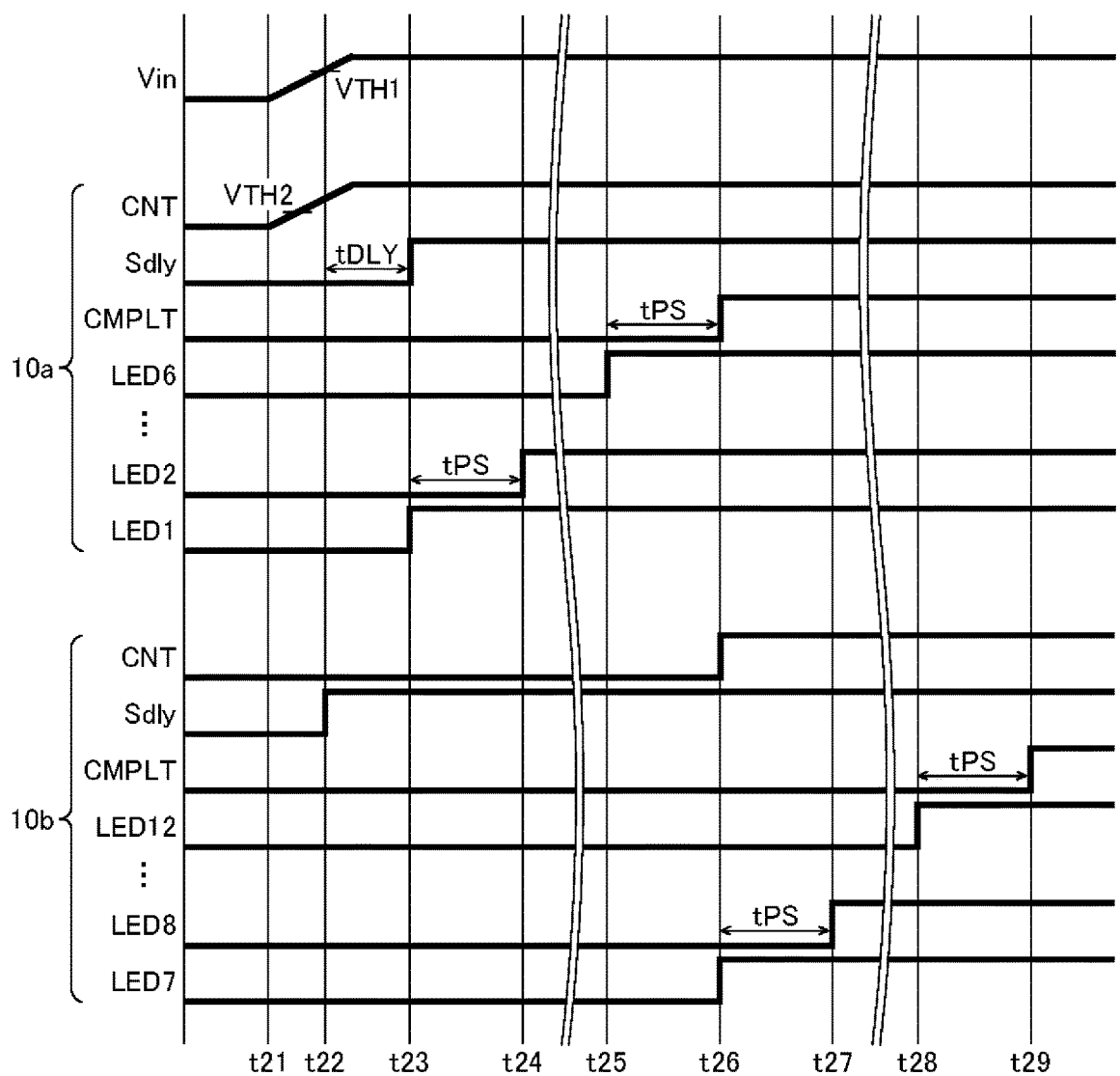
FIG. 8 is a timing chart showing one example of multi-stage coordinated operation.

FIG. 8 is a timing chart showing one example of multi-stage coordinated operation of the switch driving devices 10*a* and 10*b*, depicting, from top down, the input voltage Vin, the behavior of the switch driving device 10*a* (the CNT terminal voltage, the start delay signal Sdly, the CMPLT terminal voltage, and the lit/extinguished states (H: lit; L: extinguished) of the light-emitting diodes LEDi (where i=6, . . . , 2, 1)), and the behavior of the switch driving device 10*b* (the CNT terminal voltage, the start delay signal Sdly, the CMPLT terminal voltage, and the lit/extinguished states (H: lit; L: extinguished) of the light-emitting diodes LEDj (where j=12, . . . , 8, 7)), At time point t21, when the light-emitting device 1 starts to be supplied with electric power (when the power switch 3 or 4 in FIG. 1 is turned ON), the input voltage Vin starts to increase. In the switch driving device 10*a*, since the CNT terminal is connected to the VIN terminal, after time point t21, as the input voltage Vin increases, the CNT terminal voltage increases. On the other hand, in the switch driving device 10*b*, since that CNT terminal is connected to the CMPLT terminal of the switch driving device 10*a*, even after time point t21, the CNT terminal voltage is kept at LOW level.

At time point t22, when the input voltage Vin becomes higher than an undervoltage-absence voltage VTH1, the switch driving devices 10*a* and 10*b* come into an operable state. At this point, the CNT terminal voltage of the switch driving device 10*a* is at HIGH level (=higher than a suspension-cancel voltage VTH2). On the other hand, even at time point t22, the CNT terminal voltage of the switch driving device 10*b* is still kept at LOW level.

The logic circuits 120 provided in the switch driving devices 10*a* and 10*b* respectively delay the start of the switch driving sequence until the CNT terminal voltages they respectively monitor rise to HIGH level. Accordingly, starting at time point t22, when the undervoltage state disappears, the switch driving device 10a is in a state ready to start the switch driving sequence at any time. On the other hand, even after time point t22, the switch driving device 10b keeps suspending the start of the switch driving sequence.

Thereafter, in the switch driving device 10a, when another start delay time tDLY has elapsed from time point t22, that is, at time point t23, the start delay signal Sdly is raised to HIGH level, and the switch driving sequence is started. More specifically, in the switch driving device 10a, starting at time point t23, the light-emitting diodes LED1 to LED6 are turned ON sequentially every predetermined lighting transition time tPS.

On the other hand, in the switch driving device 10b, since its SETDLY terminal is in an open state (see FIG. 7), in response to the disappearance of the undervoltage at time point t22, the start delay signal Sdly is raised to HIGH level without delay. However, as mentioned previously, the CNT terminal voltage of the switch driving device 10b is kept at LOW level even after time point t22. Thus, even when the start delay signal Sdly is raised to HIGH level, the switch driving device 10b does not start the switch driving sequence.

After all the light-emitting diodes LED1 to LED6 are now ON at time point t25, when another lighting transition time tPS elapses, that is, at time point t26, the logic circuit 120 in the switch driving device 10a raises the CMPLT terminal voltage to HIGH level. That is, having completed the switch driving sequence, the logic circuit 120 in the switch driving circuit 10a feeds the switch driving device 10b with a delay cancellation trigger.

At time point t26, when the CMPLT terminal voltage of the switch driving device 10a rises to HIGH level, the CNT terminal voltage of the switch driving device 10b rises to HIGH level; thus, the switch driving device 10 starts the switch driving sequence. More specifically, in the switch driving device 10b, starting at time point t26, the light-emitting diodes LED7 to LED12 are turned ON sequentially every predetermined lighting transition time tPS.

After all the light-emitting diodes LED7 to LED12 are now ON at time point t28, when another lighting transition time tPS elapses, that is, at time point t29, the logic circuit 120 in the switch driving device 10b raises the CMPLT terminal voltage to HIGH level. However, no more switch driving device is connected in a stage succeeding the switch driving device 10b, no further sequential lighting control of light-emitting diodes continues.

As described above, in the light-emitting device 1 of this configuration example, first the switch driving device 10a performs sequential lighting control of the light-emitting diodes LED1 to LED6; then at the time point that a lighting transition time tPS similar to those up to then has elapsed, the switch driving device 10b continues sequential lighting control of the light-emitting diodes LED7 to LED12. Thus, when the light-emitting device 1 is seen as a whole, it achieves natural sequential lighting control as if switching the short-circuited/non-short-circuited states of the light-emitting diodes LED1 to LED12 with a single switch driving device.

This configuration example deals with a configuration where the CMPLT terminal voltage is used as a delay cancellation trigger for a subsequent stage. Seeing that the CMPLT terminal voltage indicates that "the lighting of LEDs has been completed successfully", this can be monitored by the external controller 5 to judge whether LEDs have been lit normally or abnormally.

Figure 9A:
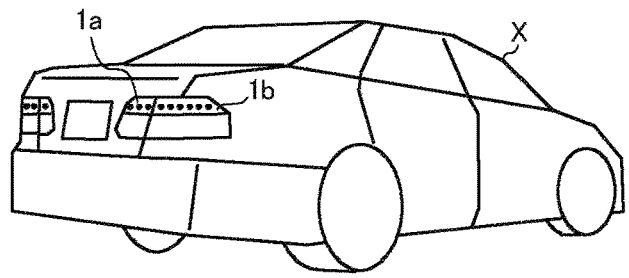
FIG. 9A is a diagram illustrating a problem with multi-stage connection of switch driving devices (a rear view of a vehicle, with a closed trunk)
Figure 9B:
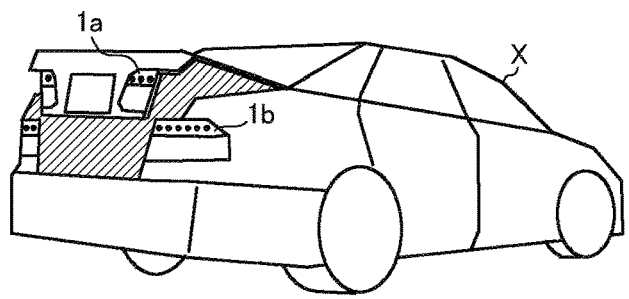
FIG. 9B is a diagram illustrating a problem with multi-stage connection of switch driving devices (a rear view of a vehicle, with an open trunk)
Figure 9C:
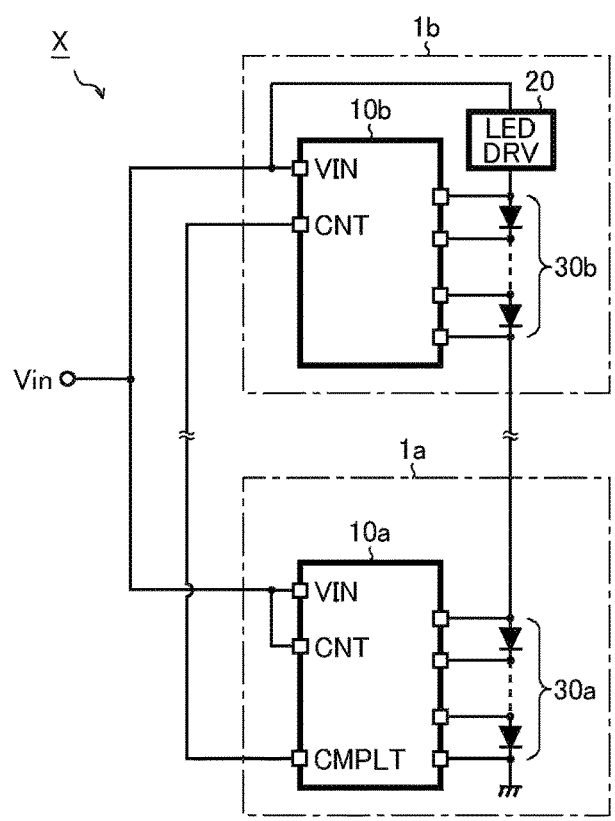
FIG. 9C is a diagram illustrating a problem with multi-stage connection of switch driving devices (showing circuit blocks)

FIGS. 9A to 9C are diagrams illustrating a problem encountered in multi-stage connection of the switch driving devices 10a and 10b. In FIGS. 9A and 9B, light-emitting devices 1a and 1b are mounted on a vehicle X as a rear turn lamp module. The light-emitting device 1a is provided on the trunk lid and the light-emitting device 1b is provided on the body. As shown in FIG. 9C, the light-emitting device 1a includes a switch driving device 10a and a light-emitting element array 30a. On the other hand, the light-emitting device 1b includes a switch driving device 10b, a light-emitting element driving device 20, and a light-emitting element array 30b. The light-emitting element arrays 30a and 30b are connected in series between the light-emitting element driving device 20 and a ground terminal.

As shown in FIG. 9A, with the trunk closed, the light-emitting devices 1a and 1b together form a single turn lamp. Here, needless to say, as shown in FIG. 9B, the trunk lid is fitted to the body in an openable/closable manner. Accordingly, connecting the CMPLT terminal of the switch driving device 10a and the CNT terminal of the switch driving device 10b in series requires a harness to be laid from the switch driving device 10a through the body to the switch driving device 10b.

As one mode of using the switch driving devices 10a and 10b shown in FIGS. 9A to 9C, a description will now be given of a method for controlling the sequential lighting of the light-emitting element arrays 30a and 30b so that these behave as a single unit by use of the start delay circuit 180 described previously without connecting the switch driving devices 10a and 10b in series.

Figure 10:
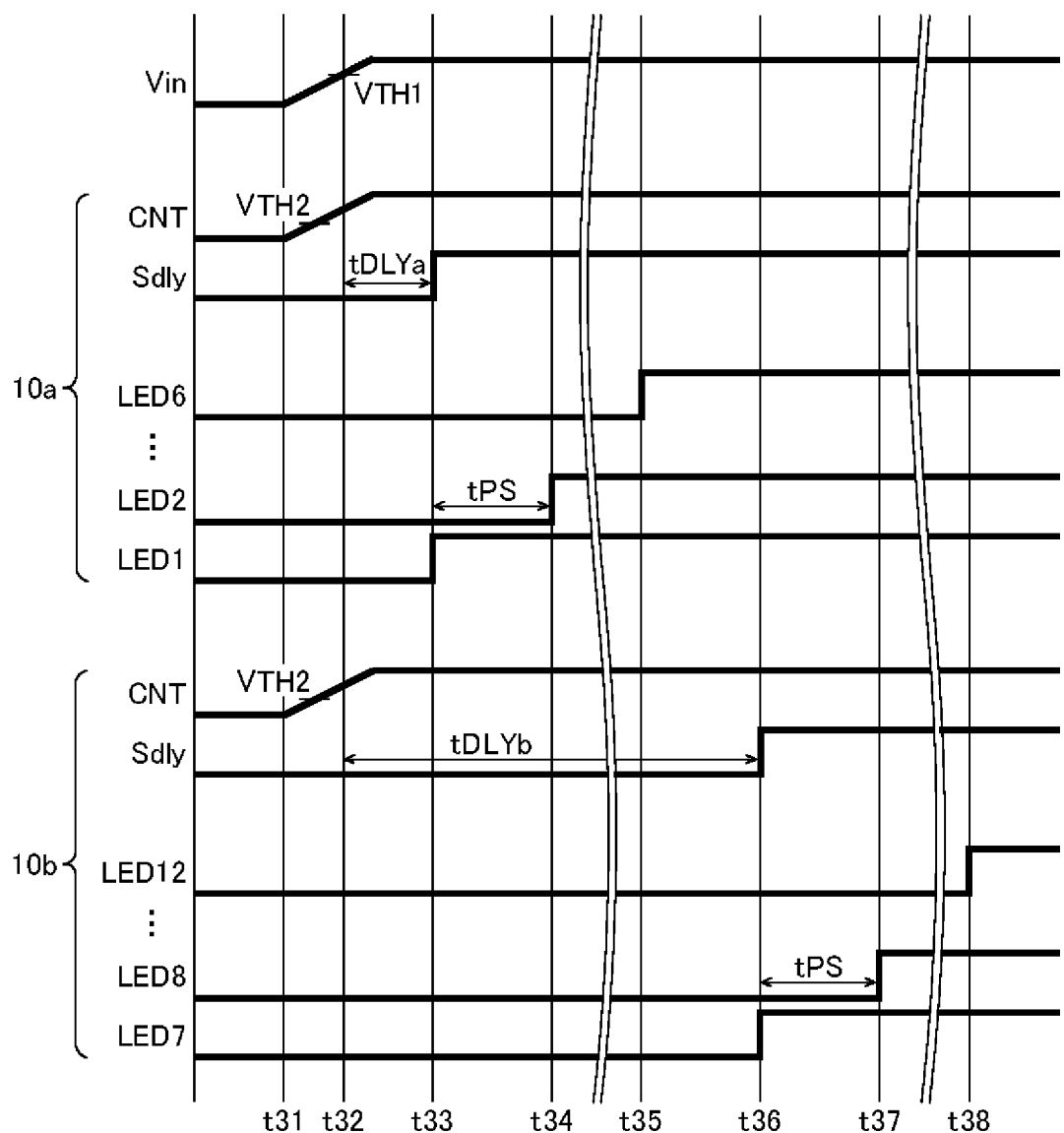
FIG. 10 is a timing chart showing one example of use of a start delay difference.

FIG. 10 is a timing chart showing one example of use of a start delay difference, depicting, from top down, the input voltage Vin, the behavior of the switch driving device 10a (the CNT terminal voltage, the start delay signal Sdly, and the light/extinguished states (H: lit; L: extinguished) of the light-emitting diodes LEDi (where i=6, . . . , 2, 1)), and the behavior of the switch driving device 10b (the CNT terminal voltage, the start delay signal Sdly, and the light/extinguished states (H: lit; L: extinguished) of the light-emitting diodes LEDj (where j=12, . . . , 8, 7)).

The following description assumes that the CNT terminal of the switch driving device 10b is connected not to the CMPLT terminal of the switch driving circuit 10a but to the VIN terminal of the switch driving device 10b. That is, here, the switch driving devices 10a and 10b each operate independently without performing multi-stage coordinated operation as described previously.

At time point t31, when the light-emitting devices 1a and 1b start to be supplied with electric power (when the power switch 3 or 4 in FIG. 1 is turned ON), the input voltage Vin starts to increase. As mentioned previously, in both the switch driving devices 10a and 10b, the CNT terminal is connected to the VIN terminal, and thus, starting at time point t31, as the input voltage Vin increases, the CNT terminal voltage also increases.

At time point t32, when the input voltage Vin becomes higher than the undervoltage-absence voltage VTH1, the switch driving devices 10a and 10b come into an operable state. At this point, the CNT terminal voltages in the switch driving devices 10a and 10b are at HIGH level (=higher than the suspension-cancel voltage VTH2).

The logic circuits 120 provided in the switch driving devices 10a and 10b respectively delay the start of the switch driving sequence until the CNT terminal voltage they respectively monitor rise to HIGH level. Accordingly, starting at time point t32, when the undervoltage state disappears, the switch driving devices 10a and 10b are both in a state ready to start the switch driving sequence at any time.

Thereafter, in the switch driving device 10a, when a first start delay time tDLYa has elapsed after time point t32, that is at time point t33, the start delay signal Sdly is raised to HIGH level, and the switch driving sequence is started. More specifically, in the switch driving device 10a, starting at time point t33, the light-emitting diodes LED1 to LED6 are turned ON sequentially every predetermined lighting transition time tPS.

On the other hand, in the switch driving device 10b, from time point t32 until a second start delay time tDLYb elapses, that is, till time point t36, the start delay signal Sdly is kept at LOW level. Here, the second start delay time tDLYb can be previously set at a length which is the sum of the first start delay time tDLYa and six times the lighting transition time tPS for as many LEDs (=tDLYa+6× tPS). With this setting, when the switch driving sequence by the switch driving device 10a is completed, the switch driving sequence by the switch driving device 10b is started. More specifically, after the light-emitting diodes LED1 to LED6 are all lit, starting at the time point that another lighting transition time tPS has elapsed, that is, starting at time point t36, in the switch driving device 10b, the light-emitting diodes LED7 to LED12 are turned ON sequentially every predetermined lighting transition time tPS.

As described above, with a configuration where the start delay times tDLYa and tDLYb are set appropriately so that, at the time that the switch driving sequence by the switch driving device 10a ends, the switch driving sequence by the switch driving device 10b starts, it is possible to achieve sequential lighting control of the light-emitting element arrays 30a and 30b without multi-stage connection of the switch driving devices 10a and 10b. Thus, for example, also in the mode of use shown in FIGS. 9A to 9C, there is no need to lay a harness between the switch driving devices 10a and 10b.

<SEL Terminals>

FIG. 11 is a table showing the relationship between the SEL terminal voltages and the number of light-emitting elements lit. The logic circuit 120 judges the number of light-emitting diodes externally fitted to the CH0 to CH8 terminals according to the combination of a plurality of SEL terminal voltages (here, the SEL1 terminal voltage, the SEL2 terminal voltage, and the SEL3 terminal voltage).

When SEL1=SEL2=SEL3=GND, the logic circuit 120 recognizes that eight light-emitting diodes LED1 to LED8 are externally fitted between every two adjacent ones of the CH0 to CH8 terminals.

When SEL1=VREG and SEL2=SEL3=GND, the logic circuit 120 recognizes that seven emitting diodes LED1 to LED7 are externally fitted between every two adjacent ones of the CH0 to CH7 terminals, and that an unused interval between channel terminals (between the CH7 and CH8 terminals) is short-circuited.

When SEL2=VREG and SEL1=SEL3=GND, the logic circuit 120 recognizes that six emitting diodes LED1 to LED6 are externally fitted between every two adjacent ones of the CH0 to CH6 terminals, and that unused intervals between channel terminals (between every two adjacent ones of the CH6 to CH8 terminals) are each short-circuited.

When SEL1=SEL2=VREG and SEL3=GND, the logic circuit 120 recognizes that five emitting diodes LED1 to LED5 are externally fitted between every two adjacent ones of the CH0 to CH5 terminals, and that unused intervals between channel terminals (between every two adjacent ones of the CH5 to CH8 terminals) are each short-circuited.

When SEL3=VREG and SEL1=SEL2=GND, the logic circuit 120 recognizes that four emitting diodes LED1 to LED4 are externally fitted between every two adjacent ones of the CH0 to CH5 terminals, and that unused intervals between channel terminals (between every two adjacent ones of the CH4 to CH8 terminals) are each short-circuited.

When SEL1=SEL3=VREG and SEL2=GND, the logic circuit 120 recognizes that three emitting diodes LED1 to LED3 are externally fitted between every two adjacent ones of the CH0 to CH4 terminals, and that unused intervals between channel terminals (between every two adjacent ones of the CH3 to CH8 terminals) are each short-circuited.

When SEL2=SEL3=VREG and SEL1=GND, the logic circuit 120 recognizes that two emitting diodes LED1 to LED2 are externally fitted between every two adjacent ones of the CH0 to CH3 terminals, and that unused intervals between channel terminals (between every two adjacent ones of the CH2 to CH8 terminals) are each short-circuited.

When SEL1=SEL2=SEL3=VREG, the logic circuit 120 recognizes that one emitting diode LED1 is externally fitted between the CH0 and CH1 terminals, and that unused intervals between channel terminals (between every two adjacent ones of the CH1 to CH8 terminals) are each short-circuited.

As described above, by use of the SEL1 to SEL3 terminals for three channels, it is possible to select one from eight different numbers of light-emitting diodes, and it is thus possible to flexibly cope with various user requirements (different numbers of light-emitting elements needed in the light-emitting device 1). Although the illustrated example deals with a configuration where the different channels are used from the ground side, instead it is also possible to use the channels from the light-emitting element driving device 20 side.

Figure 12A:
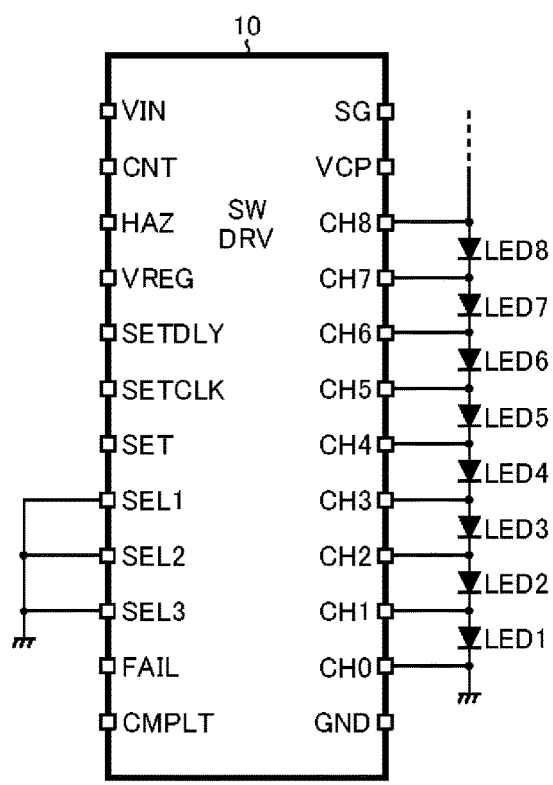
FIG. 12A is an application diagram showing one example (eight elements lit) of a setting of the number of elements lit using a SEL terminal.
Figure 12B:
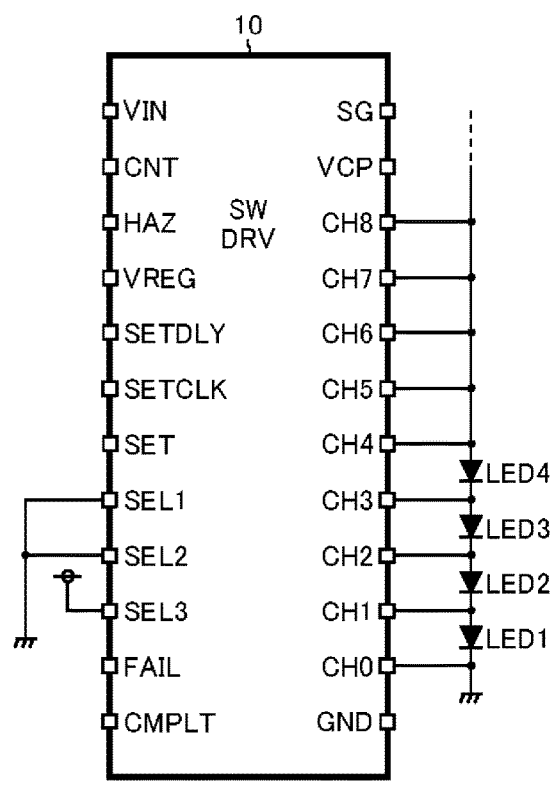
FIG. 12B is an application diagram showing one example (four elements lit) of a setting of the number of elements lit using a SEL terminal.

FIGS. 12A and 12B are application diagrams each showing an example of a setting of the number of elements lit using a plurality of SEL terminals (the SEL1 to SEL3 terminals).

In FIG. 12A, light-emitting diodes LED1 to LED8 are connected between every two adjacent ones of the CH0 to CH8 terminals. Accordingly, to make the logic circuit 120 recognize that the member of light-emitting elements lit is "eight", the SEL1 to SEL3 terminals are all connected to the ground terminal (see FIG. 1, row 1). In this case, the logic circuit 120 turns ON all the light-emitting diodes LED1 to LED8 and then raises the CMPLT terminal voltage to HIGH level. The logic circuit 120 also instructs the open/short detector 230 to take all the intervals between every two adjacent ones of the CH0 to CH8 terminals as monitoring targets.

In FIG. 12B, light-emitting diodes LED1 to LED4 are connected between every two adjacent ones of the CH0 to CH4 terminals, and unused intervals between channel terminals (every two adjacent ones of the CH4 to CH8 terminals) are each short-circuited. Accordingly, to make the logic circuit 120 recognize that the member of light-emitting elements lit is "four", the SEL1 and SEL2 terminals are connected to the ground terminal, and the SEL3 terminal is connected to the VREG terminal (see FIG. 1, row 5). In this case, the logic circuit 120 turns ON the light-emitting diodes LED1 to LED4 and then raises the CMPLT terminal voltage to HIGH level. The logic circuit 120 also instructs the open/short detector 230 to take the intervals between every two adjacent ones of the CH0 to CH4 terminals as monitoring targets and exclude the intervals between every two adjacent ones of the CH4 to CH8 terminals from monitoring targets.

As described above, based on a setting of the number of elements lit using a plurality of SET terminals (the SEL1 to SEL3 terminals), the logic circuit 120 switches channels to be ignored when checking for completion of the switch driving sequence, and switches, for each channel, whether to mask the open/short detecting function.

<All-Lit Mode (Hazard Mode)>

Figure 13A:
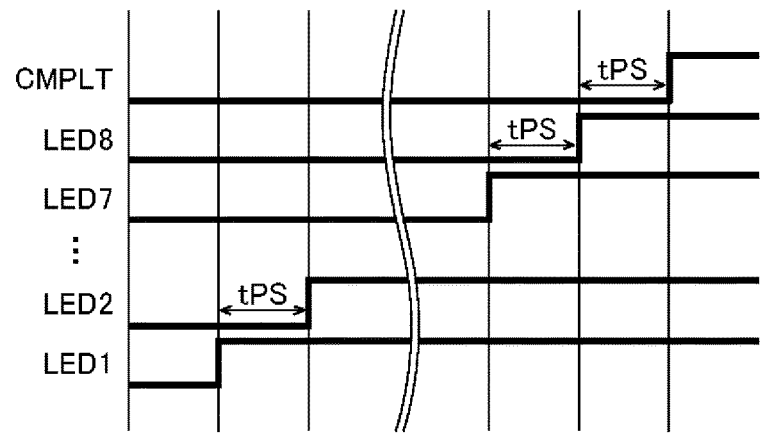
FIG. 13A is a timing chart (sequential lighting) illustrating an all-lit mode.
Figure 13B:
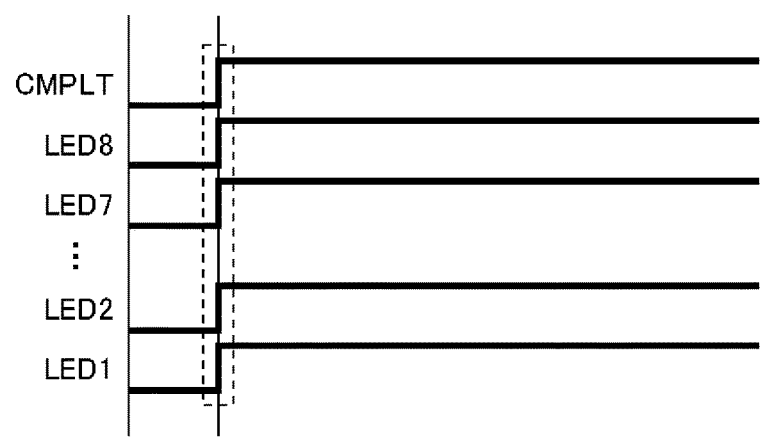
FIG. 13B is a timing chart (simultaneous lighting) illustrating an all-lit mode.
Figure 13C:
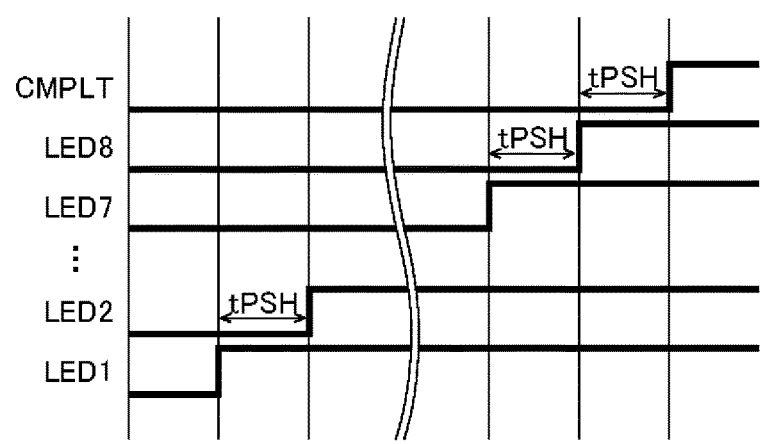
FIG. 13C is a timing chart (enlarged) illustrating an all-lit mode.

FIG. 13A to 13C are timing charts illustrating an all-lit mode of the light-emitting diodes LED1 to LED8, depicting, from top down in each diagram, the CMPLT terminal voltage and the lit/distinguished states (H: lit; L: extinguished) of the light-emitting diodes LED* (where *=8, 7, ..., 2, 1).

FIG. 13A shows the behavior in a sequential-lighting mode (normal mode) in which, according to the switch driving sequence described previously, the switch elements SW1 to SW8 are driven sequentially so that the light-emitting diodes LED1 to LED8 are lit sequentially every predetermined lighting transition time tPS. In the sequential-lighting mode, the light-emitting diodes LED1 to LED8 are lit sequentially, for example, according to the direction in which the vehicle X is making a turn. Advantageously, this permits passengers and other vehicles easy, intuitive recognition of the traveling direction of the vehicle X. With this advantage taken into consideration, the sequential-lighting mode can be said to be an operation mode suitable when the vehicle X makes a right or left turn or changes lanes (when the turn lever is operated to turn the power switch 3 ON).

On the other hand, FIG. 13B shows the behavior in an all-lit mode (hazard mode) in which all the switch elements SW1 to SW8 are turned OFF simultaneously so that the light-emitting diodes LED1 to LED8 are lit simultaneously. For example, when the vehicle X makes an emergency stop or an emergency slow-down (when the hazard button is depressed to turn the power switch 4 ON), to indicate urgency to other vehicles, it is preferable to light all the light-emitting diodes LED1 to LED8 immediately.

However, turning OFF the switch elements SW1 to SW8 completely simultaneously and lighting the light-emitting diodes LED1 to LED8 completely simultaneously causes an abrupt change in the load for the charge pump 220 and the light-emitting element driving device 20, and this may destabilize their operation.

To avoid that, as shown in FIG. 13C (a timing chart showing, on an enlarged scale, the region surrounded by a broken line in FIG. 13B), the logic circuit 120 does not turn ON the light-emitting diodes LED1 to LED8 completely simultaneously but turn them ON every predetermined high-speed lighting transition time tPSH (<tPS). Thus, between the sequential-lighting mode and the all-lit mode, the switch driving sequence itself is quite the same, the only difference being the operating frequency. The high-speed lighting transition time tPSH can be set at several hundred microseconds.

As described above, by performing sequential lighting control of the light-emitting diodes LED1 to LED8 at so high a speed as to be visually unrecognizable by the human eye, it is possible, while lighting the light-emitting diodes LED1 to LED8 apparently at the same time, to suppress an abrupt change in the load. However, in a case where no consideration needs to be given to a change in the load (for example, in a case where the charge pump 220 and the light-emitting element driving device 20 have sufficient output capacities), in the all-lit mode, all the light-emitting diodes LED1 to LED8 may be lit completely simultaneously.

Switching between the sequential-lighting mode and the all-lit mode is achieved by use of the selector 210. As mentioned previously, when the HAZ terminal voltage is at LOW level and in addition the first and second abnormality detection signals Swdt1 and Swdt2 are both at a logic level (for example, HIGH level) corresponding to abnormality absence, the selector 210 selectively feeds the variable clock signal CLK to the logic circuit 120. This output state corresponds to the state where the sequential-lighting mode is selected. In this state, the logic circuit 120 performs the switch driving sequence in synchronism with the variable clock signal CLK. Accordingly, the light-emitting diodes LED1 to LED8 are lit sequentially every lighting transition time tPS (for example, 50 ms) depending on the variable clock signal CLK.

On the other hand, when the HAZ terminal voltage is at HIGH level, or when at least one of the first and second abnormality detection signals Swdt1 and Swdt2 is at a logic level (for example, LOW level) corresponding to abnormality presence, the selector 210 selectively feeds the internal clock signal INTCLK to the logic circuit 120. This output state corresponds to the state where the all-lit mode is selected. In this state, the logic circuit 120 performs the switch driving sequence in synchronism with the internal clock signal INTCLK which has a higher frequency than that of the variable clock signal CLK. Accordingly, the light-emitting diodes LED1 to LED8 are lit sequentially every high-speed lighting transition time tPSH (several hundred microseconds) depending on the internal clock signal INTCLK. Thus, when a hazard signal is received from outside the device, or when an abnormality in the switch driving sequence is detected, the logic circuit 120, operating in the all-lit mode described previously, turns OFF the switch elements SW1 to SW8 simultaneously in the all-lit mode and thereby lights the light-emitting diodes LED1 to LED8 simultaneously.

In the light-emitting device 1 of this configuration example, the internal clock signal INTCLK for driving the charge pump 220 is exploited to quicken the switch driving sequence in the all-lit mode. Thus, there is no need to add a dedicated oscillator to suppress an abrupt change in the load in the all-lit mode, and this helps save an unnecessary increase in the circuit scale of the light-emitting device 1.

Figure 14A:
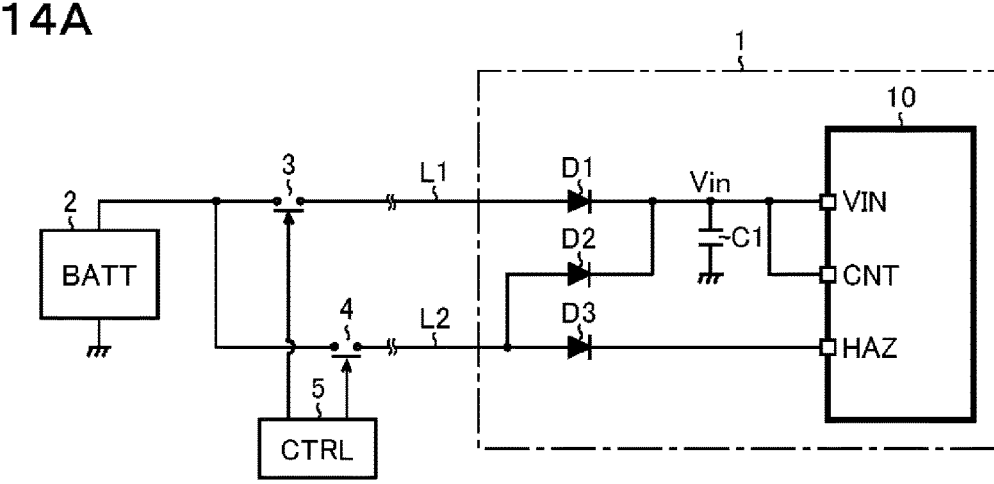
FIG. 14A is an application diagram showing a variation (first example) of connection of a HAZ terminal.
Figure 14B:
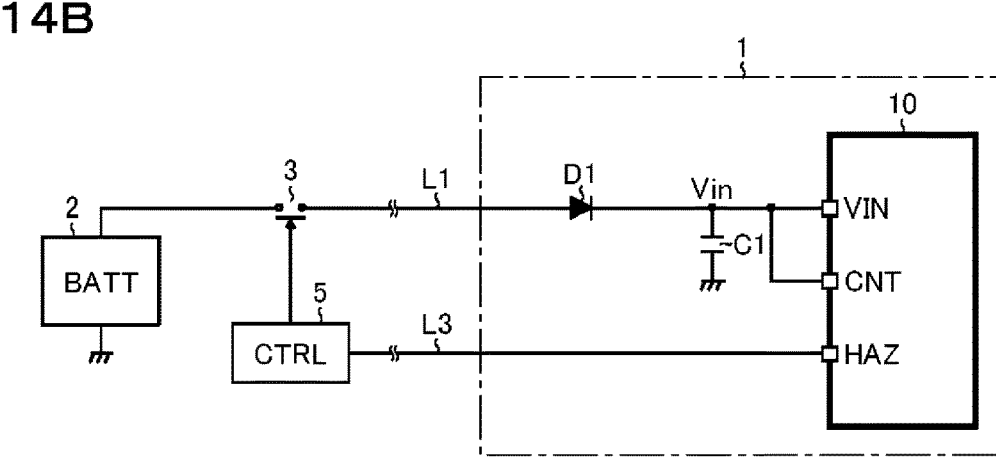
FIG. 14B is an application diagram showing a variation (second example) of connection of a HAZ terminal.
Figure 14C:
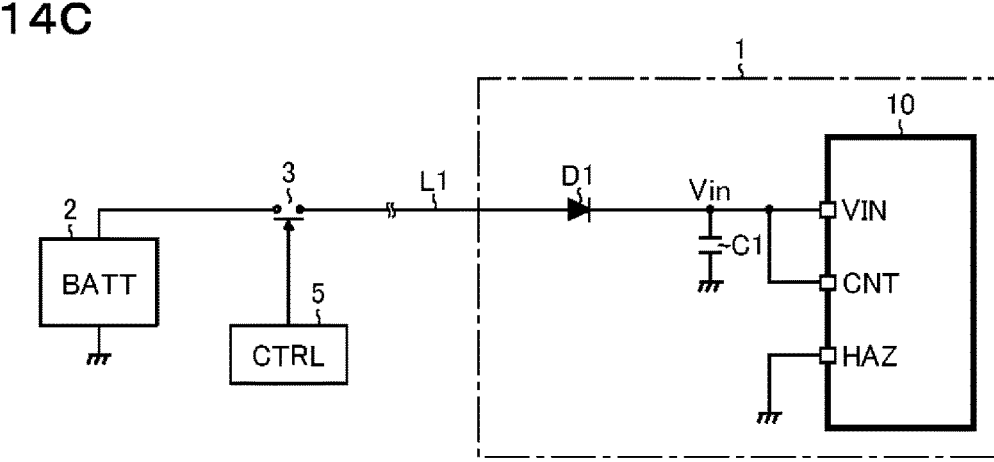
FIG. 14C is an application diagram showing a variation (third example) of connection of a HAZ terminal.

FIGS. 14A to 14C are application diagrams showing variations of the connection of the HAZ terminal. FIG. 14A shows a configuration where, as in FIG. 1 referred to earlier, the power switches 3 and 4 are connected in parallel between the light-emitting device 1 and the battery 2. When the hazard button is depressed and the power switch 4 is turned ON, the HAZ terminal voltage turns to HIGH level, and the light-emitting device 1 is lit in the all-lit mode. With this configuration, two power lines L1 and L2 are required between the light-emitting device 1 and the battery 2.

FIG. 14B shows a configuration where the power switch 4, the diodes D2 and D3, and the power line L2 are omitted and instead a signal line L3 is connected from the controller 5 to the HAZ terminal. With this configuration, both when the turn lever is operated and when the hazard button is depressed, the controller 5 turns the power switch 3 ON. Moreover, when the power switch 3 is ON as a result of the hazard button being depressed, the controller 5 keeps the HAZ terminal at HIGH level, and otherwise the controller 5 keeps the HAZ terminal at LOW level. With this configuration, it is possible to reduce the number of components compared with the configuration in FIG. 14.

In a case where no use is made of the all-lit mode described above, as shown in FIG. 14C, the HAZ terminal can be connected to the ground terminal.

<Watchdog Timers>

Figure 15A:
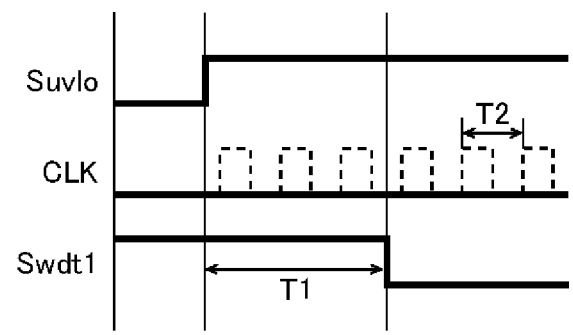
FIG. 15A is a timing chart showing an example of the operation of a first watchdog timer.
Figure 15B:
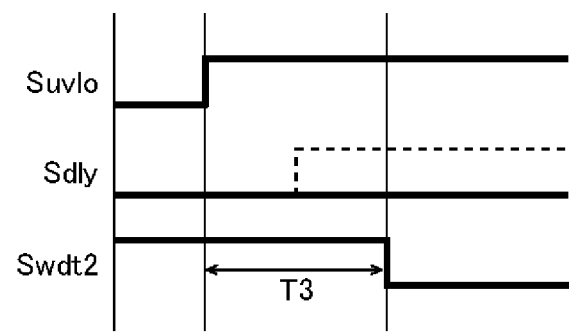
FIG. 15B is a timing chart showing an example of the operation of a second watchdog timer.

FIGS. 15A and 15B are timing charts each showing an example of the operation of an watchdog timer. FIG. 15A shows one example of the operation of the first watchdog timer 190, depicting, from top down, the UVLO signal Suvlo, the variable clock signal CLK, and the first abnormality detection signal Swdt1. FIG. 15B shows one example of the operation of the second watchdog timer 200, depicting, from top down, the UVLO signal Suvlo, the start delay signal Sdly, and the second abnormality detection signal Swdt2.

Once the capacitor C4 externally fitted to the SETCLK terminal is short-circuited across it, even when an undervoltage state disappears and the UVLO signal Suvlo rises to HIGH level, the SETCLK terminal voltage continues to remain at the ground level. As a result, no pulses ever appear again in the variable clock signal CLK, and thus the switch driving sequence by the logic circuit 120 cannot be started.

Likewise, once the capacitor C3 externally fitted to the SETDLY terminal is short-circuited across it, even when an undervoltage state disappears and the UVLO signal Suvlo rises to HIGH level, the SETDLY terminal voltage continues to remain at the ground level. As a result, the start delay signal Sdly does not ever rise to HIGH level, and thus the switch driving sequence by the logic circuit 120 cannot be started.

As described above, once at least either of the capacitors C3 and C4 is short-circuited, the switch driving device 10 no longer operates, and thus the light-emitting diodes LED1 to LED8 remain extinguished. In this state, even when the driver operates the turn lever or the hazard button, the light-emitting device 1 (turn lamp) is not lit, and this is a very dangerous state.

To avoid that, the first watchdog timer 190 monitors the variable clock signal CLK to generate the first abnormality detection signal Swdt1. More specifically, if, after the UVLO signal Suvlo rises to HIGH level, a predetermined abnormality detection period T1 elapses without a pulse being generated in the variable clock signal CLK, or if the pulse period T2 of the variable clock signal CLK does not fall within a predetermined normal range, the first watchdog timer 190 judges that the SETCLK terminal is abnormal, and switches the first abnormality detection signal Swdt1 to a logic level (for example, LOW level) corresponding to abnormality presence.

On the other hand, the second watchdog timer 200 monitors the start delay signal Sdly to generate the second abnormality detection signal Swdt2. More specifically, if, after the UVLO signal Suvlo rises to HIGH level, a predetermined abnormality detection period T3 elapses while the start delay signal Sdly remains at LOW level, the second watchdog timer 200 judges that the SETDLY terminal is abnormal, and switches the second abnormality detection signal Swdt2 to a logic level (for example, LOW level) corresponding to abnormality presence.

In response to at least either of the first and second abnormality detection signals Swdt1 and Swdt2 switching to the logic level corresponding to abnormality presence, the selector 210 comes into a state in which it selectively feeds the internal clock signal INTCLK to the logic circuit 120. With this configuration, the logic circuit 120 can perform the switch driving sequence in the all-lit mode in synchronism with the internal clock signal INTCLK.

Moreover, in response to at least either of the first and second abnormality detection signals Swdt1 and Swdt2 switching to the logic level corresponding to abnormality presence, the selector 210 switches the FAIL terminal voltage to a logic level (for example, LOW level) corresponding to abnormality presence. With this configuration, it is possible, from the external controller 5, to grasp an abnormality in the switch driving device 10, and this makes it possible to alert the driver to it.

By, implementing the watchdog timer functions described above, it is possible to provide a high-safety vehicle X that conforms to the FMEA (failure mode and effect analysis) standard and the like.

Although the illustrated example deals with a configuration where the variable clock signal CLK and the start delay signal Sdly are taken as monitoring targets, this is not meant to limit the monitoring targets of the first and second watchdog timers 190 and 200; instead, the SETCLK terminal voltage and the SETDLY terminal voltage may be taken as monitoring targets <Synopsis>

As described above, the switch driving device 10 is configured such that, in implementing a comparatively simple function of sequential lighting, whereas a basic lighting pattern is fixed, only those parameters which need to be adjusted by a user can be set arbitrarily with a few externally-fitted elements (a resistor, a capacitor, and the like). With this configuration, it is possible to perform sequential lighting largely similar to that practiced conventionally without the need for control by a microprocessor, and it is thus possible to simplify the set design, reduce the number of components, reduce the circuit board area, reduce costs, achieve high efficiency, stabilize the set operation, and so forth.

<Applications>

Figure 16A:
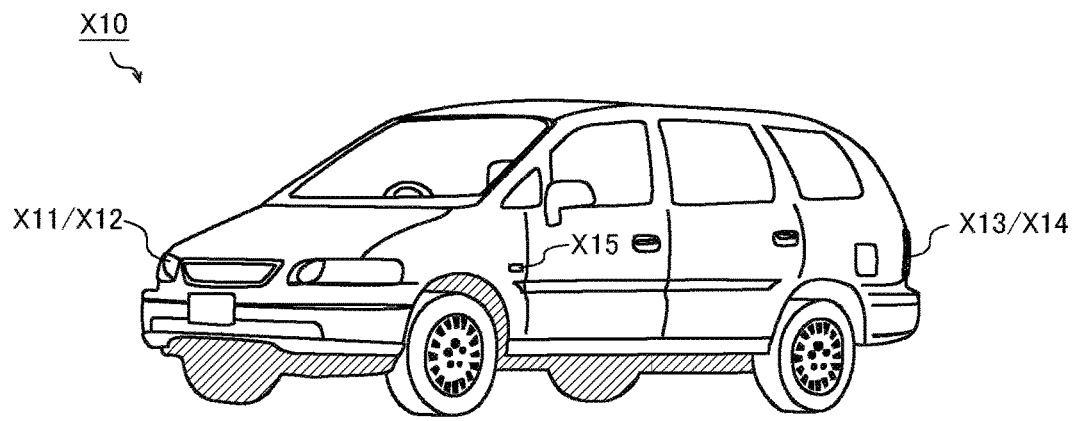
FIG. 16A is an exterior view of a vehicle mounted with a light-emitting device (a front view)
Figure 16B:
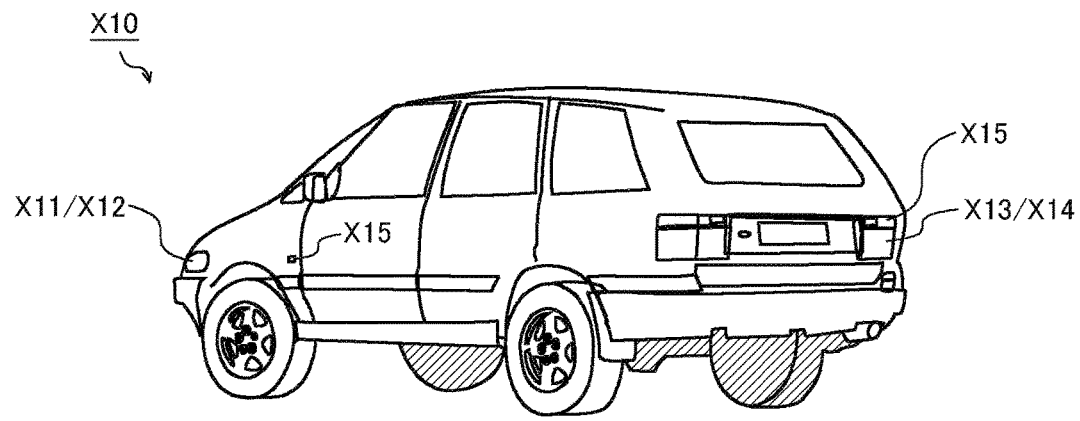
FIG. 16B is an exterior view of a vehicle mounted with a light-emitting device (a rear view)

The light-emitting device 1 can be used suitably as, for example as shown in FIGS. 16A and 16B, a headlamp (comprising any of a high-beam lamp, a low-beam lamp, a small lamp, a fog lamp, and the like as necessary) X11, a daytime running lamp (DRL) X12, a tail lamp (comprising any of a small lamp, a back lamp, and the like as necessary) X13, a stop lamp X14, a turn lamp X15, or the like. In particular, as described above, the switch driving device 10 is suitable as a turn lamp X15 of a sequential type.

Figure 17A:
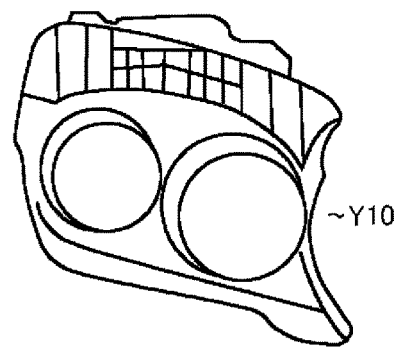
FIG. 17A is an exterior view of a vehicle-mounted lamp module (headlamp module)
Figure 17B:
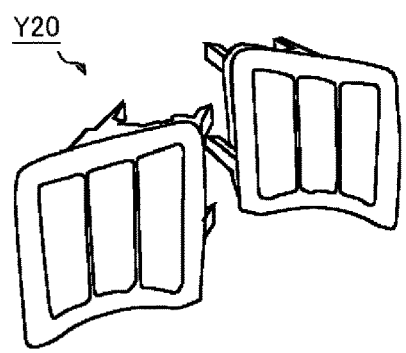
FIG. 17B is an exterior view of a vehicle-mounted lamp module (turn lamp module)
Figure 17C:
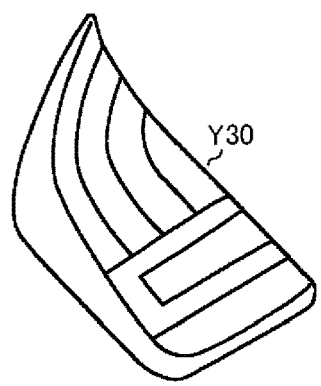
FIG. 17C is an exterior view of a vehicle-mounted lamp module (rear lamp module)
Figure 18:
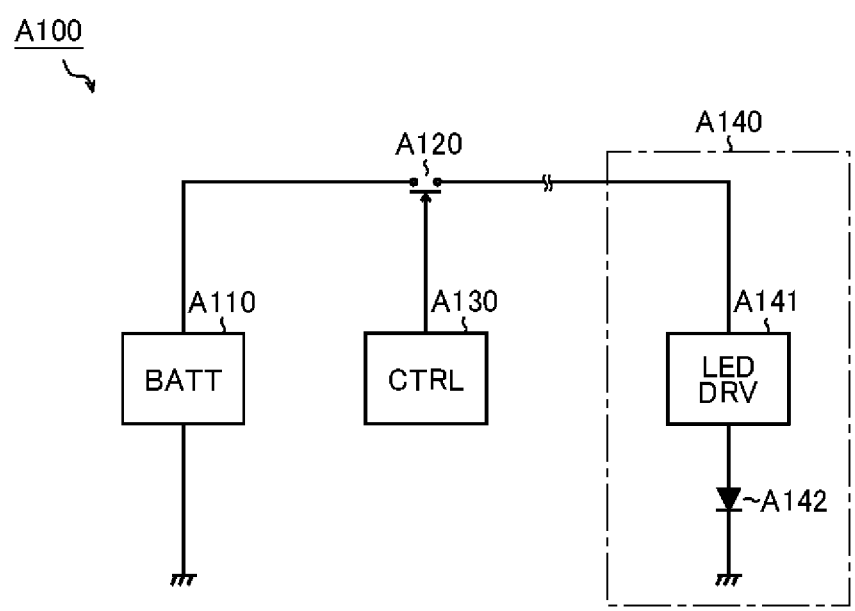
FIG. 18 is an application diagram showing a vehicle as a first conventional example.
Figure 19A:
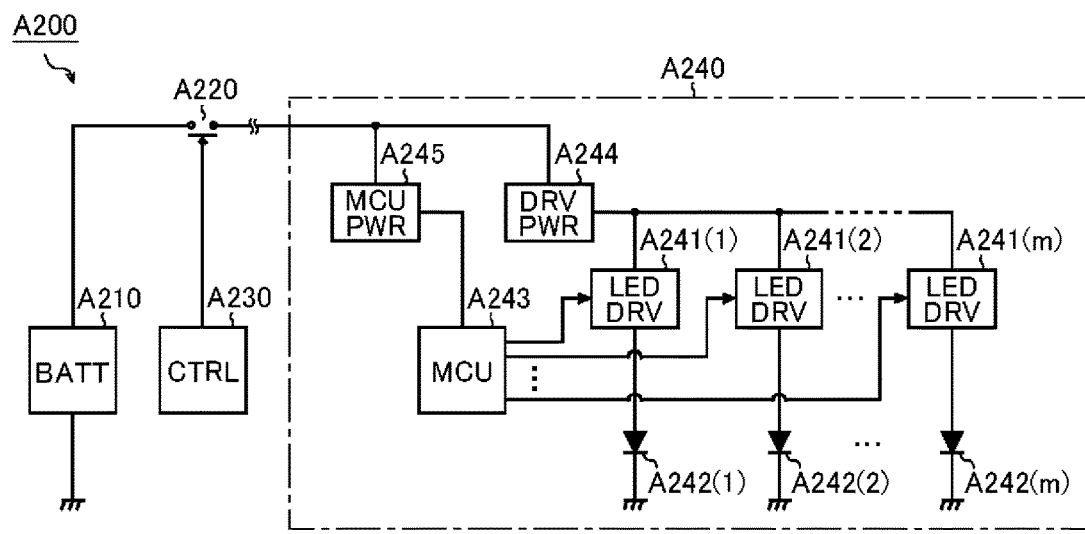
FIG. 19A is an application diagram showing a vehicle as a second conventional example (with an incorporated microprocessor)
Figure 19B:
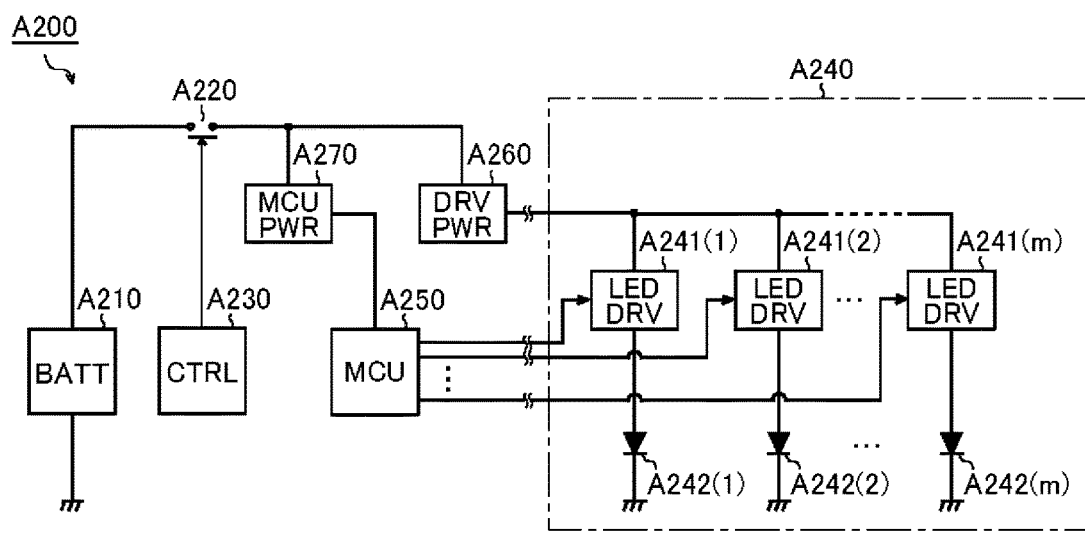
FIG. 19B is an application diagram showing a vehicle as a second conventional example (with an externally-fitted microprocessor)
Figure 20A:
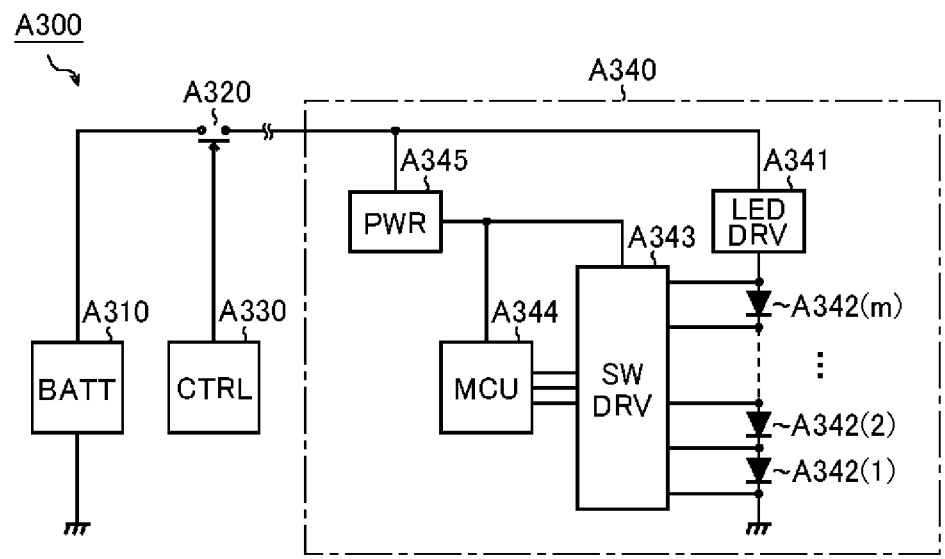
FIG. 20A is an application diagram showing a vehicle as a third conventional example (with an incorporated microprocessor)
Figure 20B:
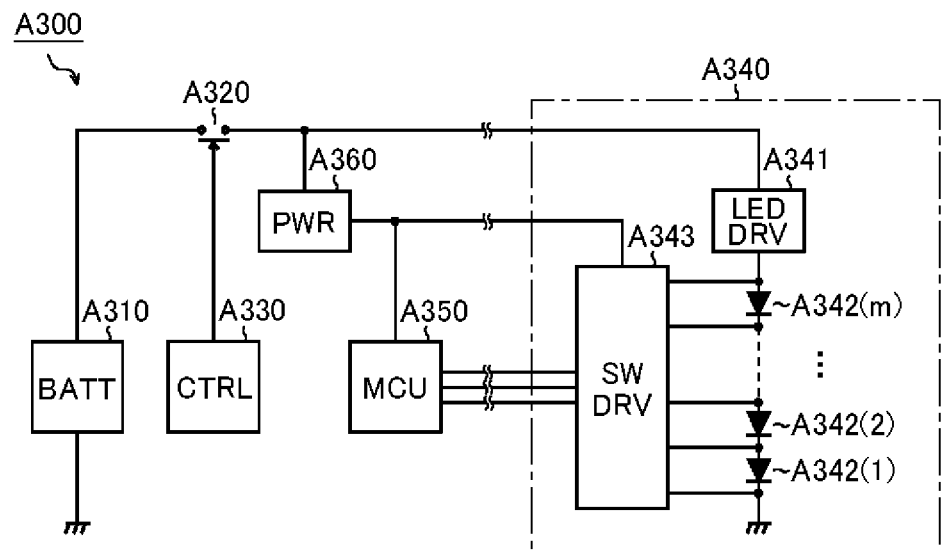
FIG. 20B is an application diagram showing a vehicle as a third conventional example (with an externally-fitted microprocessor).%

The switch driving device 10 and the light-emitting element driving device 20 described previously may be provided, along with the light-emitting element array 30 as the driving target, in the form of a vehicle-mounted lamp module (such as a headlamp module Y10 in FIG. 17A, a turn lamp module Y20 in FIG. 17B, and a rear lamp module Y30 in FIG. 17C), or in the form of single ICs independent of the light-emitting element array 30.

<Other Modifications>

While the above description deals with an example where light-emitting diodes are used as light-emitting elements, this is not meant to limit how the present invention should be implemented. Instead, for example, organic EL (electroluminescence) elements may be used as light-emitting elements.

That is, the various technical features disclosed herein may be implemented in any other manner than specifically described by way of embodiments above, and allows for many modifications within the scope of the technical ingenuity of the invention. That is, the embodiments described above should be considered to be in every aspect illustrative and not restrictive, and the technical scope of the present invention should be understood to be defined not by the description of embodiments given above but by the appended claims and to encompasses any modifications in the sense and scope equivalent to those of the claims.

INDUSTRIAL APPLICABILITY

The invention disclosed herein finds applications in vehicle-mounted light-emitting devices (or switch driving sequences used in them) provided with a sequential lighting function.

LIST OF REFERENCE SIGNS 1, 1a, 1b light-emitting device (turn lamp module)
2 battery
3, 4 power switch
5 controller
10, 10a, 10b switch driving circuit (matrix switch driver IC)
20 light-emitting element driving device (LED driver IC)
30, 30a, 30b light-emitting element array (LED string)
100 switch circuit
110 driver circuit
120 logic circuit
130 internal regulator
140 UVLO circuit
150 current setter
160 oscillator
170 frequency setter
180 start delay circuit
171, 181 current source
172, 182 switch
173, 183 N-channel MOS field-effect transistor
174, 184 comparator
185 D flip-flop
186 filter
190 first watchdog timer
200 second watchdog timer
210 selector
220 charge pump
230 open/short detector
LED1 to LED12 light-emitting element (light-emitting diode)
R1 to R5 resistor
C1 to C9 capacitor
D1 to D3 diode
SW1 to SW8 switch element
DRV1 to DRV8 driver
L1, L2 power line
13 signal line
X, X10 vehicle
X11 headlamp
X12 daytime running lamp (DRL) light source
X13 tail lamp
X14 stop lamp
X15 turn lamp
Y10 headlamp module
Y20 turn lamp module
Y30 rear lamp module

The invention claimed is:

1. A switch driving device configured to drive switch elements for a plurality of channels connected in parallel with a plurality of light-emitting elements, respectively, included in a vehicle-mounted light-emitting device, wherein the switch driving device comprises: a logic circuit configured to automatically start, in response to electric power starting to the supplied to the device, a switch driving sequence to switch ON/OFF states of the switch elements sequentially in a predetermined pattern; a current setter configured to generate a reference current; and a start delay circuit configured to set a start delay time of the switch driving sequence arbitrarily according to a parameter value of an externally-fitted element and a current value of the reference current; and further comprising: an oscillator configured to generate an internal clock signal; a frequency setter configured to generate a variable clock signal; and a selector configured to feed the logic circuit selectively with either the internal clock signal or the variable clock signal.

2. The switch driving device according to claim 1, wherein the logic circuit is configured to output a current supply start trigger for each of the light-emitting elements to a light-emitting element driving device external to the device after expiry of an unstable-operation period of each of the switch elements before starting the switch driving sequence.

3. The switch driving device according to claim 1, further comprising:
a frequency setter configured to set an operating frequency of the switch driving sequence by use of an externally-fitted element.

4. The switch driving device according to claim 1, wherein the logic circuit is configured to output a suspension cancellation trigger to another switch driving device after completion of the switch driving sequence.

5. The switch driving device according to claim 1, wherein the logic circuit is configured to recognize a number of lit light-emitting elements according to a voltage at an external terminal.

6. The switch driving device according to claim 1, wherein the logic circuit is configured to operate not only in a sequential-lighting mode in which the logic circuit drives the switch elements sequentially according to the switch driving sequence, but also in an all-lit mode in which the logic circuit turns all the switch elements OFF simultaneously.

7. The switch driving device according to claim 6, wherein the logic circuit is configured,
in the sequential-lighting mode, to perform the switch driving sequence in synchronism with a first clock signal and,
in the all-lit mode, to perform the switch driving sequence in synchronism with a second clock signal with a higher frequency than a frequency of the first clock signal.

8. The switch driving device according to claim 7, further comprising:
a driver circuit configured to drive the plurality of switch elements individually;
a charge pump configured to supply the driver circuit with a stepped-up voltage; and
an oscillator configured to generate an internal clock signal needed for the charge pump to operate, wherein the internal clock signal is used as the second clock signal.

9. The switch driving device according to claim 6, wherein the logic circuit is configured to turn all the switch elements OFF simultaneously in the all-lit mode when a hazard signal is fed in from outside the device or when an abnormality in the switch driving sequence is detected.

10. The switch driving device according to claim 1, further comprising:
a watchdog timer configured to monitor for an abnormality in the start delay time or the operating frequency of the switch driving sequence.

11. A light-emitting device comprising:
a plurality of light-emitting elements;
a light-emitting element driving device configured to generate a driving current for each of the light-emitting elements; and
the switch driving device according to claim 1.

12. The light-emitting device according to claim 11, wherein the plurality of light-emitting elements are each a light-emitting diode or an organic electroluminescence element.

13. The light-emitting device according to claim 11, wherein the light-emitting device is mounted on a vehicle as a headlamp module, a turn lamp module, or a rear lamp module.

14. A vehicle comprising:
the light-emitting device according to claim 11.

15. The vehicle according to claim 14, wherein the light-emitting device is used as at least one of a headlamp, a daytime running lamp, a tail lamp, a stop lamp, and a turn lamp.

16. The switch driving device according to claim 3, wherein the frequency setter sets the operating frequency of the switch driving sequence according to a parameter value of the externally-fitted element and the current value of the reference current.

17. The switch driving device according to claim 1, wherein the current setter is configured to adjust the reference current by use of an externally-fitted element.

18. A switch driving device configured to drive switch elements for a plurality of channels connected in parallel with a plurality of light-emitting elements, respectively, included in a vehicle-mounted light-emitting device, wherein the switch driving device comprises:
a logic circuit configured to automatically start, in response to electric power starting to be supplied to the device, a switch driving sequence to switch ON/OFF states of the switch elements sequentially in a predetermined pattern,
wherein the logic circuit is configured to operate not only in a sequential-lighting mode in which the logic circuit drives the switch elements sequentially according to the switch driving sequence, but also in an all-lit mode in which the logic circuit turns all the switch elements OFF simultaneously,
wherein the logic circuit is configured,
in the sequential-lighting mode, to perform the switch driving sequence in synchronism with a first clock signal and,
in the all-lit mode, to perform the switch driving sequence in synchronism with a second clock signal with a higher frequency than a frequency of the first clock signal,
wherein the switch driving device further comprises:
a driver circuit configured to drive the plurality of switch elements individually;
a charge pump configured to supply the driver circuit with a stepped-up voltage; and
an oscillator configured to generate an internal clock signal needed for the charge pump to operate,
wherein the internal clock signal is used as the second clock signal.

* * * * *